United States Patent
Nigam et al.

(10) Patent No.: US 10,887,812 B2
(45) Date of Patent: *Jan. 5, 2021

(54) METHOD OF HANDLING RADIO LINK FAILURE IN WIRELESS COMMUNICATION SYSTEM BASED ON MULTI-ENB CONNECTIVITY AND APPARATUS THEREOF

(71) Applicant: Samsung Electronics Co., Ltd., Gyeonggi-do (KR)

(72) Inventors: Anshuman Nigam, Karnataka (IN); Jung Min Moon, Gyeonggi-do (KR); Jung Soo Jung, Gyeonggi-do (KR); Sun Heui Ryoo, Gyeonggi-do (KR); Sung Jin Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/685,537

(22) Filed: Nov. 15, 2019

(65) Prior Publication Data

US 2020/0084686 A1    Mar. 12, 2020

Related U.S. Application Data

(63) Continuation of application No. 16/255,123, filed on Jan. 23, 2019, now Pat. No. 10,512,019, which is a (Continued)

(30) Foreign Application Priority Data

Aug. 12, 2013 (IN) .............................. 948/KOL/2013
Nov. 11, 2013 (KR) ........................ 10-2013-0136482
(Continued)

(51) Int. Cl.
*H04W 36/30* (2009.01)
*H04W 72/12* (2009.01)
(Continued)

(52) U.S. Cl.
CPC ......... *H04W 36/30* (2013.01); *H04W 36/305* (2018.08); *H04W 72/1268* (2013.01); *H04W 88/02* (2013.01); *H04W 88/08* (2013.01)

(58) Field of Classification Search
CPC ............... H04W 36/30; H04W 36/305; H04W 72/1268; H04W 88/08; H04W 88/02
(Continued)

(56) References Cited

U.S. PATENT DOCUMENTS 8,305,966 B2    11/2012   Chou
9,055,560 B2    6/2015    Johansson
(Continued)

FOREIGN PATENT DOCUMENTS

KR    1020100129690    12/2010
KR    1020120030946    3/2012
(Continued)

OTHER PUBLICATIONS

International Search Report dated Nov. 4, 2014 issued counterpart application No. PCT/KR2014/006764.
(Continued)

*Primary Examiner* — Hirdepal Singh
(74) *Attorney, Agent, or Firm* — The Farrell Law Firm, P.C.

(57) ABSTRACT

Methods and apparatuses are provided in a wireless communication system supporting dual connectivity of a first base station and a second base station. A predetermined number of consecutive out-of-syncs for a special cell are received. A timer for the special cell is started. A radio link failure (RLF) is detected upon an expiration of the timer. A failure message including failure type is transmitted to the first base station in case that the RLF for the special cell is associated with the second base station.

20 Claims, 25 Drawing Sheets

Related U.S. Application Data continuation of application No. 15/158,157, filed on May 18, 2016, now Pat. No. 10,225,784, which is a continuation of application No. 14/457,898, filed on Aug. 12, 2014, now Pat. No. 9,723,533.

(30) Foreign Application Priority Data

Mar. 21, 2014 (IN) .............................. 361/KOL/2014
Apr. 25, 2014 (KR) ........................ 10-2014-0050293

(51) Int. Cl.
 *H04W 88/02* (2009.01)
 *H04W 88/08* (2009.01)

(58) Field of Classification Search
 USPC ....................................................... 455/423
 See application file for complete search history.

(56) References Cited

U.S. PATENT DOCUMENTS

| | | | |
|---|---|---|---|
| 9,763,151 | B2 | 9/2017 | Kim |
| 9,894,702 | B2* | 2/2018 | Mishra ................. H04W 36/08 |
| 10,075,279 | B2 | 9/2018 | Yang |
| 2005/0181479 | A1 | 8/2005 | Dall'Acqua et al. |
| 2011/0103221 | A1 | 5/2011 | Lee |
| 2011/0190016 | A1 | 8/2011 | Hamabe |
| 2011/0250892 | A1 | 10/2011 | Gupta et al. |
| 2012/0069728 | A1 | 3/2012 | Jung et al. |
| 2012/0069732 | A1 | 3/2012 | Xu et al. |
| 2012/0108199 | A1 | 5/2012 | Wang |
| 2012/0164952 | A1 | 6/2012 | Lee et al. |
| 2012/0276897 | A1 | 11/2012 | Kwon et al. |
| 2012/0281548 | A1 | 11/2012 | Lin et al. |
| 2013/0033991 | A1 | 2/2013 | Gao et al. |
| 2013/0303155 | A1 | 11/2013 | Da Silva |
| 2014/0080468 | A1 | 3/2014 | Zhang |
| 2014/0126403 | A1 | 5/2014 | Slomina |
| 2014/0274030 | A1 | 9/2014 | Aminzadeh |
| 2014/0295840 | A1 | 10/2014 | Keskitalo |
| 2014/0295860 | A1 | 10/2014 | Kuo |
| 2015/0009802 | A1 | 1/2015 | Wager |
| 2015/0023319 | A1 | 1/2015 | Park |
| 2015/0043490 | A1 | 2/2015 | Wu |
| 2015/0045035 | A1 | 2/2015 | Nigam et al. |
| 2015/0092686 | A1 | 4/2015 | Cui |
| 2015/0223106 | A1 | 8/2015 | Van Phan |
| 2015/0245261 | A1 | 8/2015 | Teyeb |
| 2015/0264738 | A1* | 9/2015 | Lee ................... H04W 36/0072 370/228 |
| 2015/0271763 | A1 | 9/2015 | Balachandran |
| 2015/0365994 | A1 | 12/2015 | Yu |
| 2016/0007252 | A1* | 1/2016 | Larmo .............. H04W 36/0088 370/332 |
| 2016/0021696 | A1 | 1/2016 | Chuang |
| 2016/0037579 | A1* | 2/2016 | Jung ..................... H04W 24/04 370/252 |
| 2016/0057802 | A1 | 2/2016 | Lee |
| 2016/0080947 | A1* | 3/2016 | Watanabe ............... H04W 8/02 370/254 |
| 2016/0100447 | A1* | 4/2016 | Chen .................... H04W 76/15 370/329 |
| 2016/0183321 | A1* | 6/2016 | Wen ..................... H04W 76/18 370/329 |
| 2017/0099621 | A1* | 4/2017 | Michaelsen ........... H04W 36/08 |

FOREIGN PATENT DOCUMENTS

| | | |
|---|---|---|
| KR | 1020120091485 | 8/2012 |
| KR | 1020120121692 | 11/2012 |
| KR | 1020130060194 | 6/2013 |
| WO | WO 2012/107647 | 8/2012 |
| WO | WO 2013/019153 | 2/2013 |
| WO | WO 2013/091161 | 6/2013 |
| WO | WO 2014/111027 | 7/2014 |
| WO | WO 2014/163436 | 10/2014 |

OTHER PUBLICATIONS

Intel Corporation "Radio Link Failure Handling for Dual Connectivity", R2-131990, 3GPP TSG RAN WG2 Meeting #82, May 20-25, 2013, 4 pages.

Pantech, "Analysis of the RLF in Dual Connectivity", R2-131100, 3GPP TSG-RAN WG2 Meeting #81bis, Apr. 15-19, 2013, 5 pages.

3rd Generation Partnership Project; Technical Specification Group Radio Access Network; Evolved Universal Terrestrial Radio Access (E-UTRA); Radio Resource Control (RRC); Protocol Specification (Release 11), 3GPP TS 36.331 V11.4.0, Jun. 2013, 346 pages.

Australian Examination Report dated Nov. 6, 2017 issued counterpart application No. 2014307257, 8 pages.

Indian Examination Report dated Aug. 25, 2020 issued counterpart application No. 201637004457, 8 pages.

Korean Office Action dated Sep. 17, 2020 issued counterpart application No. 10-2014-0050293, 3 pages.

* cited by examiner

METHOD OF HANDLING RADIO LINK FAILURE IN WIRELESS COMMUNICATION SYSTEM BASED ON MULTI-ENB CONNECTIVITY AND APPARATUS THEREOF

PRIORITY

This application is a Continuation application of U.S. patent application Ser. No. 16/255,123, filed in the U.S. Patent and Trademark Office (USPTO) on Jan. 23, 2019, which is a Continuation Application of U.S. patent application Ser. No. 15/158,157, filed in the USPTO on May 18, 2016, now U.S. Pat. No. 10,225,784, issued on Mar. 5, 2019, which is a Continuation Application of U.S. patent application Ser. No. 14/457,898, filed in the USPTO on Aug. 12, 2014, now U.S. Pat. No. 9,723,533, issued on Aug. 1, 2017, which claims priority under 35 U.S.C. § 119(a) to Indian Provisional Patent Application Nos. 948/KOL/2013 and 361/KOL/2014, filed on Aug. 12, 2013 and Mar. 21, 2014, respectively, and Korean Patent Application Nos. 10-2013-0136482 and 10-2014-0050293, filed on Nov. 11, 2013 and Apr. 25, 2014, respectively, the contents of which are incorporated herein by reference.

BACKGROUND OF THE INVENTION

1. Field of the Invention

The present invention relates generally to a communication method and apparatus between a User Equipment (UE) and an evolved NodeB (eNB) in a wireless communication system, and more particularly, to a method of handling multi-eNB connectivity when a radio link failure of the UE is generated.

2. Description of the Prior Art

A 3rd Generation Partnership Project (3GPP) Long Term Evolution (LTE) (Release 11 and earlier) system is based on a single connectivity model in which one UE is connected to one eNB. In such a system, handling Radio Link Failure (RLF) is based on the detection of the RLF by the UE. A link with the eNB is in an RLF state, so that the RLF is based on additional actions performed by the UE without any notification of the RLF to the eNB.

FIG. 1 is a diagram illustrating handling of the RLF in a mobile communication system, and FIG. 2 is a flowchart illustrating a process of handling the RLF in a mobile communication system.

Referring to FIG. 1, in order to detect the RLF, the UE may perform a process known as Radio Link Monitoring (RLM). The UE may measure a Block Error Rate (BLER) of a Physical Downlink Control Channel (PDCCH) during a predetermined time period. When the BLER drops below a preset threshold (Qout) during the predetermined time period, an out-of-sync indication may be generated in a physical (PHY) layer. When a preset N310 number of successive out-of-sync indications are reported to a Radio Resource Control (RRC) layer by the PHY layer, an RLF timer T310 is started by the RRC layer. At this time, when the RLF timer expires, the RLF may be declared. Further, when the timer T310 starts, and then a predefined N311 number of successive in-sync indications are reported by the PHY layer, the timer T310 may stop.

Referring to FIG. 2, a UE 210 generates the RLF in a first link, in step 251. Further, after the timer T310 expires, the UE 210 may declare the RLF. In the declaration of the RLF, the UE 210 may stop all uplink transmission to avoid a possibility of the generation of uplink interference, and deactivate all radio bearers. Further, the UE 210 scans and is synchronized with a target cell 240, in step 252, and transmits a connection re-establishment request message to the target cell 240, in step 253. When the target cell 240 already has UE context, in step 254, the target cell 240 transmits a connection re-establishment success message to the UE 210, in step 255. After the successful re-establishment, the connection between the UE 210 and the target cell 240 resumes, in step 256.

However, when the target cell 240 does not have the UE context, in step 257, the target cell 240 transmits a connection re-establishment failure message to the UE 210, in step 258. After the connection failure, the UE 210 enters an idle mode, in step 259, and the UE 210 eventually triggers a new connection with the target cell 240, in steps 260 and 261. This may cause an application level connection to terminate, and thus, is very undesirable. Further, it should be noted that the target cell 240 has the UE context only when a handover is performed before the RLF is generated. Accordingly, a re-establishment process may be successfully achieved only in such a scenario.

When the preset maximum number of random accesses has failed, the existence of the system RLF may be also triggered. Further, when the preset maximum number of RLF retransmissions is performed, the RLF may be also triggered.

The related art discloses content in which the UE scans a proper target cell after declaring the RLF, and transmits an RLF indication indicating that the RLF is generated in a previous eNB (by notifying of an ID of the previous eNB) to the selected target cell in a single connectivity system (3GPP LTE Release 11 and earlier). The target cell transmits the information to the previous eNB. The previous eNB having received the information may improve handover parameters, which may cause the RLF and other radio link parameters.

The terms eNB and cell may be exchangeably used throughout.

SUMMARY OF THE INVENTION

The present invention has been made to address at least the above problems and/or disadvantages and to provide at least the advantages described below. Accordingly, an aspect of the present invention a mechanism which can efficiently handle the RLF and reduce an influence on an application level connection in a system where the UE is connected to one or more eNBs.

In accordance with an aspect of the present invention, a method by a terminal is provided in a wireless communication system supporting dual connectivity of a first base station and a second base station. A predetermined number of consecutive out-of-syncs for a special cell are received. A timer for the special cell is started. An RLF is detected upon an expiration of the timer. A failure message including failure type is transmitted to the first base station in case that the RLF for the special cell is associated with the second base station.

In accordance with another aspect of the present invention, method by a first base station is provided in a wireless communication system supporting dual connectivity of a first base station and a second base station. A terminal is connected with via a cell associated with the first base station. An RLF for a special cell is detected upon an expiration of a timer for the special cell. A failure message including failure type is received from the terminal in case that the RLF for the special cell is associated with the second base station. The timer is started in case that a predetermined number of consecutive out-of-syncs for the special cell is received at the terminal.

In accordance with another aspect of the present invention, a terminal is provided in a wireless communication system supporting dual connectivity of a first base station and a second base station. The terminal includes a transceiver, and a controller coupled with the transceiver. The controller is configured to receive a predetermined number of consecutive out-of-syncs for a special cell, start a timer for the special cell, detect an RLF upon an expiration of the timer, and transmit a failure message including failure type to the first base station in case that the RLF for the special cell is associated with the second base station.

In accordance with another aspect of the present invention, a first base station is provided in a wireless communication system supporting dual connectivity. The first base station includes a transceiver, and a controller coupled with the transceiver. The controller is configured to connect with a terminal via a cell associated with the first base station. An RLF for a special cell is detected upon an expiration of a timer for the special cell. The controller is also configured to receive, from the terminal, a failure message including failure type in case that the RLF for the special cell is associated with the second base station. The timer is started in case that a predetermined number of consecutive out-of-syncs for the special cell is received at the terminal.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF THE EMBODIMENTS OF THE PRESENT INVENTION

Figure 1:
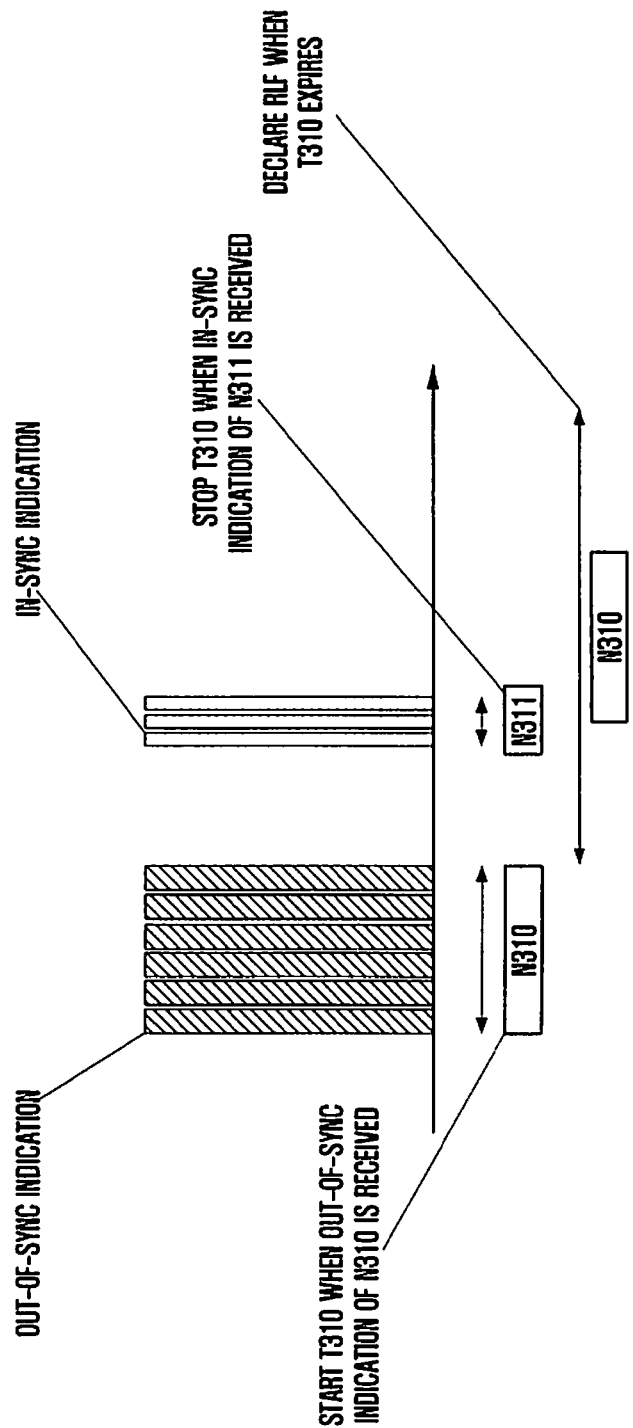
FIG. 1 is a diagram illustrating the handling of RLF in a mobile communication system.
Figure 2:
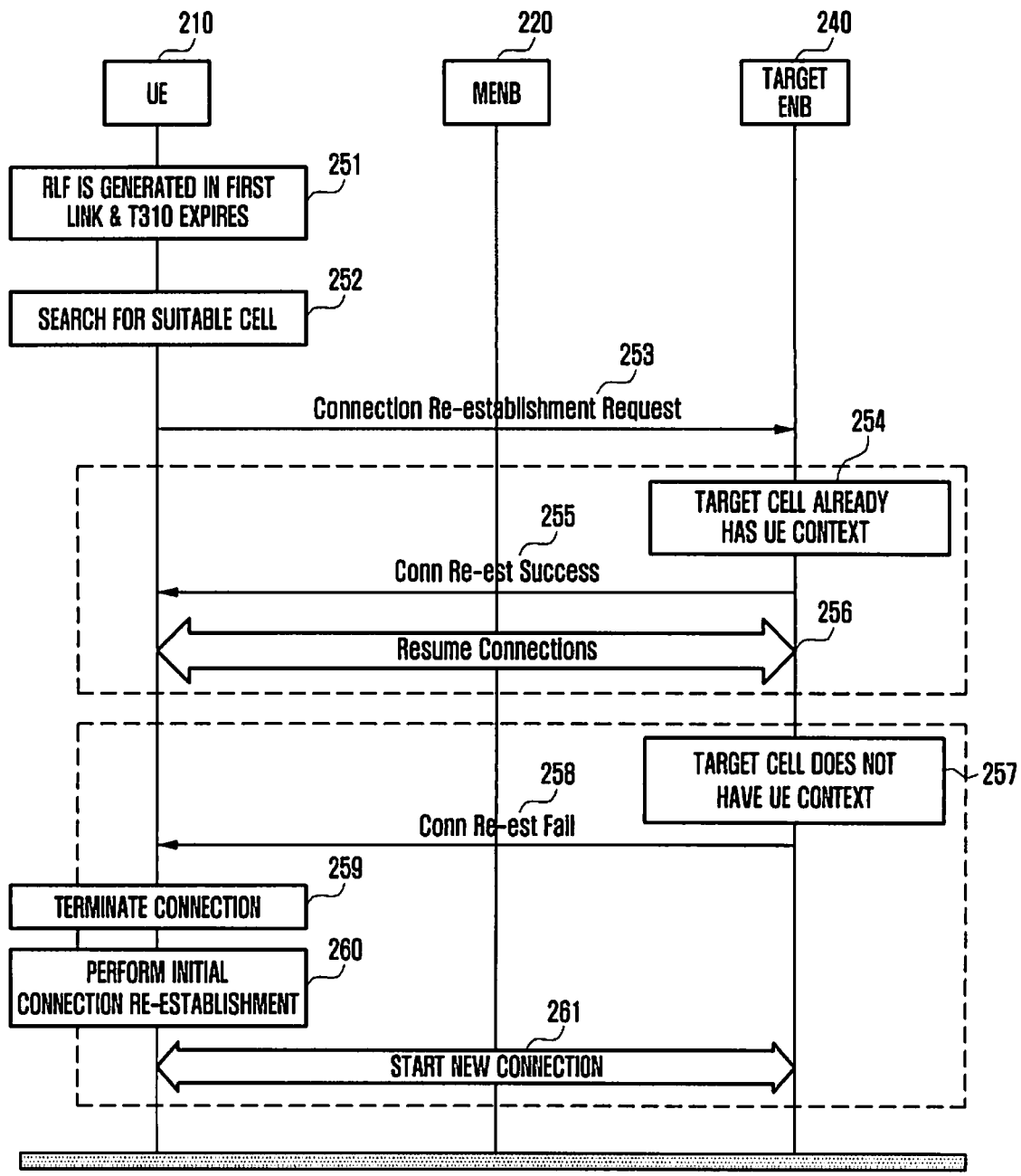
FIG. 2 is a flowchart illustrating a process of handling the RLF in a mobile communication system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms described below are defined in consideration of the functions in the present disclosure, and may be different according to users, intentions of the users, or customs. Therefore, the definitions of the terms should be determined based on the contents throughout the specification.

Figure 3:
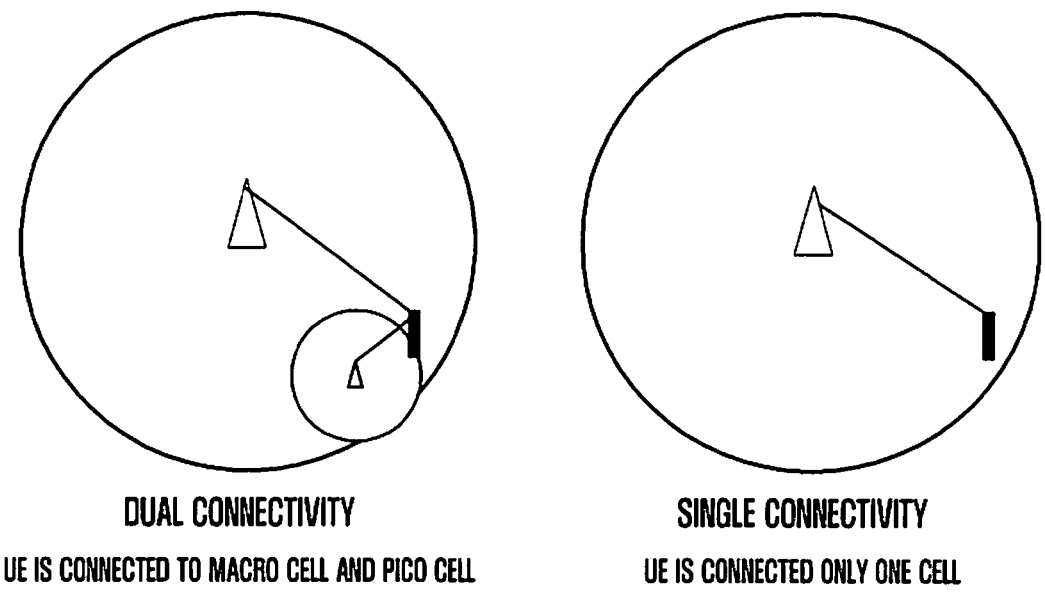
FIG. 3 is a diagram illustrating dual connectivity, according to an embodiment of the present invention.

FIG. 3 is a diagram illustrating dual connectivity, according to an embodiment of the present invention.

Referring to FIG. 3, 3GPP LTE Release 12 has discussed dual connectivity as a core technology to increase user efficiency and achieve high mobility robustness. In such a dual connectivity scenario, the UE may be simultaneously connected to a macro cell and a pico cell. However, simultaneous transmission/reception of the two cells may be or may not be possible according to the capability of the UE. The macro cell and the pico cell are in harmony to be helpful to the UE. In such a system, the macro cell serves as a mobility anchor and hides a pico cell change from a core network, which can significantly reduce signaling loads of the core network. While the pico cell may handle much of the traffic, the macro cell may handle more important traffic such as, for example, Voice over Internet Protocol (VoIP) traffic. One cell (macro cell) may serve as an MeNB and the other cell (pico cell) may serve as an SeNB.

At this time, it is preferable to maintain as many UEs as possible in a dual connectivity mode during an RRC connected state in order to keep high user efficiency.

The RLF in one link may cause a loss of the dual connectivity mode, and accordingly interrupt the connectivity. Accordingly, in handing the LRF in the dual connectivity, it is important for the UE to maintain the dual connectivity mode even through one of the radio links is in an RLF state.

Handling of the RLF in the dual connectivity system is described in greater detail below.

In the dual connectivity, one or both of an MeNB link and an SeNB link may be in the RLF state. As described below, when one link is in the RLF state, it may be referred to as "single link RLF" or "partial RLF". Further, when both links are in the RLF state, it may be referred to as "dual link RLF" or "complete RLF". As described above, the RLF scenario includes the following:
1. Single link RLF
   a. MeNB link is in RLF state
   b. SeNB link is in RLF state
2. Dual link RLF
   a. Both MeNB link and SeNB link are in RLF state Since the UE has two links (one is the link with the MeNB and the other one is the link with the SeNB) in the dual connectivity, the UE may have one good link even though the other link is in the RLF state, thereby improving the handling of the RLF. That is, the good link may be used for handling the RLF of the other link.

In Carrier Aggregation (CA) of 3GPP LTE Rel. 10/11, a Primary Cell (Pcell) may determine Secondary Cell (Scell) link quality based on a Channel Quality Indicator (CQI) report. Further, since it is assumed that an SCell can be deactivated according to the SCell link quality, RLM for the SCell is not performed. CQIs of all cells are configured to be reported to the PCell through only a Physical Uplink Control CHannel (PUCCH) through which the CQIs are transmitted. However, whether the MeNB can have a CQI report of the SeNB in the dual connectivity has not been yet agreed (scenario 1b). Further, when a connection between the MeNB and the UE does not have good radio quality, it is unclear how the MeNB has its CQI (scenario 1a).

In addition, in the CA of Rel. 10/11, the PUCCH is transmitted only in the PCell. However, when the same access cannot be made in the dual connectivity, non-ideal backhaul may influence the operation.

In the CA of Rel. 10/11, the handling of the RLF is applied only when the MeNB (PCell) link is in the RLF state, and may refer to the re-establishment for all connections including the connections of the SeNB (SCell). When the re-establishment is not successful, all connections are terminated and may be required to be re-established. Such access may consider the SeNB link to be good while it is still in the RLF.

A re-establishment process may be successful only when a cell in which the re-establishment is performed has been already prepared to accept the UE. A situation that is not a handover may not influence the connection being progressed.

In contrast, there has not been a process for handling the RLF of the SeNB (SCell).

In a method of handling the RLF, the RLF for a link in the RLF state may be independently performed. For example, in the scenario 1b, after the RLF for the SeNB is declared, the UE may find a suitable target cell and attempt the re-establishment. When the target cell already has the UE context, the re-establishment may be successful. When the target cell does not already have the UE context, connections operating for the link of the SeNB (eNB having a link in which the RLF is generated) will be removed and initial connection establishment for the connections should be made (as initial dual connectivity mode establishment). Such a method is suitable for the scenario 1b, and may be also applied to the scenario 1a.

Alternatively, when the re-establishment fails, the UE may be switched to a single connectivity with an eNB having a good link.

The above described methods of handling the RLF may have a bad influence on application level connections, and accordingly, may increase the loss of the dual connectivity mode and the switching between the dual connectivity and the single connectivity.

In an embodiment of the present invention, a method is described in which a good link (which is not in the RLF state) informs the MeNB of the RLF state of another link. The MeNB may prepare an alternative cell instead of the cell of the link in the RLF state. Thereafter, the MeNB may perform triggering such that the UE hands over to the prepared cell instead of performing re-establishment. This may prevent the loss of the dual connectivity mode and maintain continuous connections in a smooth manner. Alternatively, when the suitable alternative cell is not found, the MeNB may prepare a cell having a good link to provide the single connectivity mode to the UE (from cells in connection with the provision of the dual connectivity to the UE). In order to detect the RLF from the link, an RLM process may be performed on the link.

The above-described method may be applied in both the RLF scenario 1a and scenario 1b. At this time, the UE context is required to be maintained until a predetermined time after the RLF timer T310 expires. Further, in order to quickly prepare the alternative cell, an RLF indication may be transmitted to the MeNB through another good link before the RLF is declared in one link.

Figure 18:
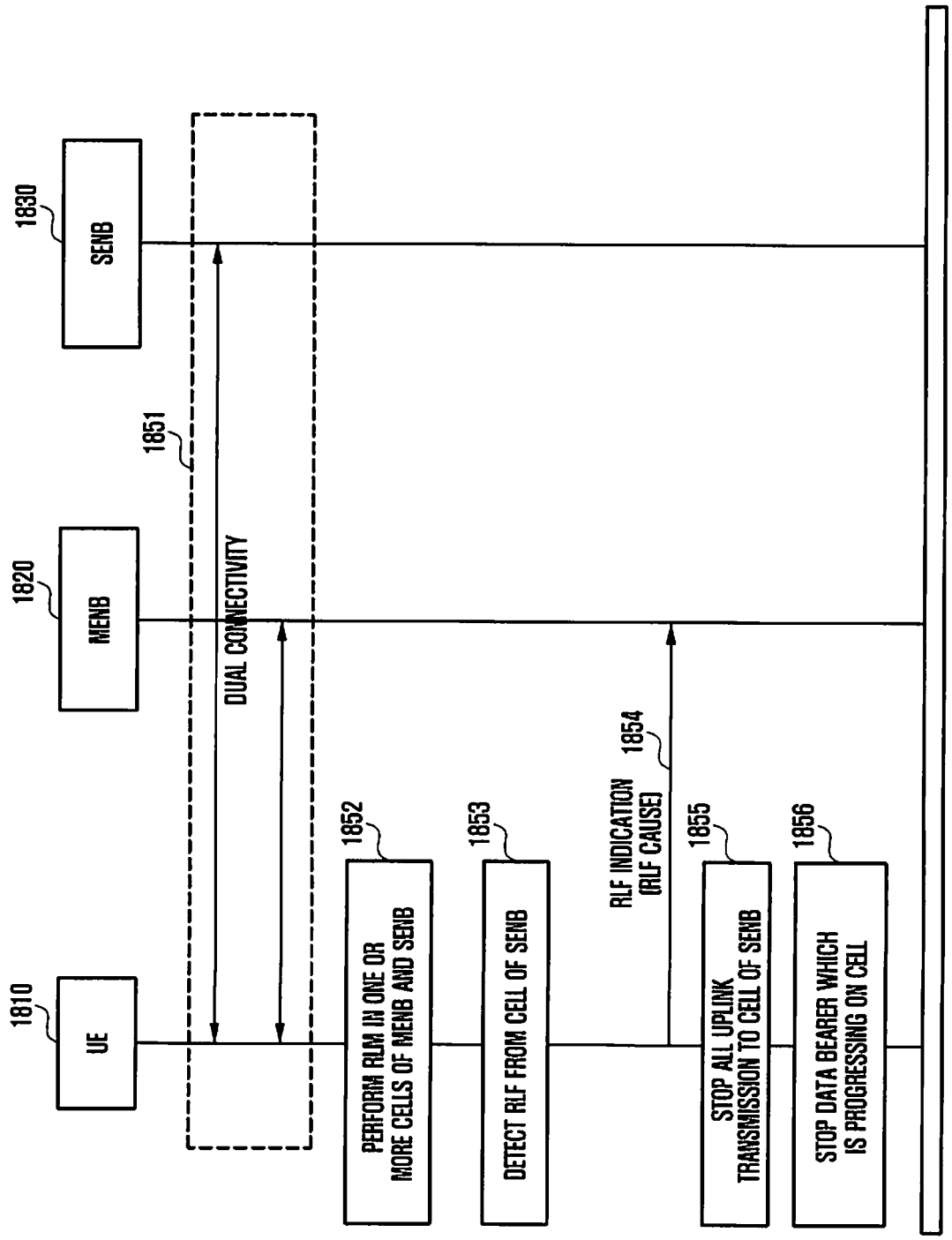
FIG. 18 is a flowchart illustrating an operation of transmitting an RLF indication by a UE and an MeNB, according to an embodiment of the present invention.

FIG. 18 is a flowchart illustrating an operation of transmitting an RLF indication by the UE and the MeNB, according to an embodiment of the present invention.

Referring to FIG. 18, a UE 1810 is dually connected to an MeNB 1820 and an SeNB 1830, in step 1851. Further, in step 1852, the UE 1810 performs the RLM in one or more cells of the MeNB 1820 and the SeNB 1830. Thereafter, when the UE 1810 detects the RLF in the cell of the SeNB 1830, in step 1853, the UE 1810 transmits an RLF indication, including RLF cause information, to the PCell of the MeNB 1820, in step 1854. After transmitting the RLF indication, the UE 1810 stops all uplink transmission including the configured PUCCH, in step 1855, and stops a data radio bearer which is working in the cell from which the RLF is detected, in step 1856.

Figure 19:
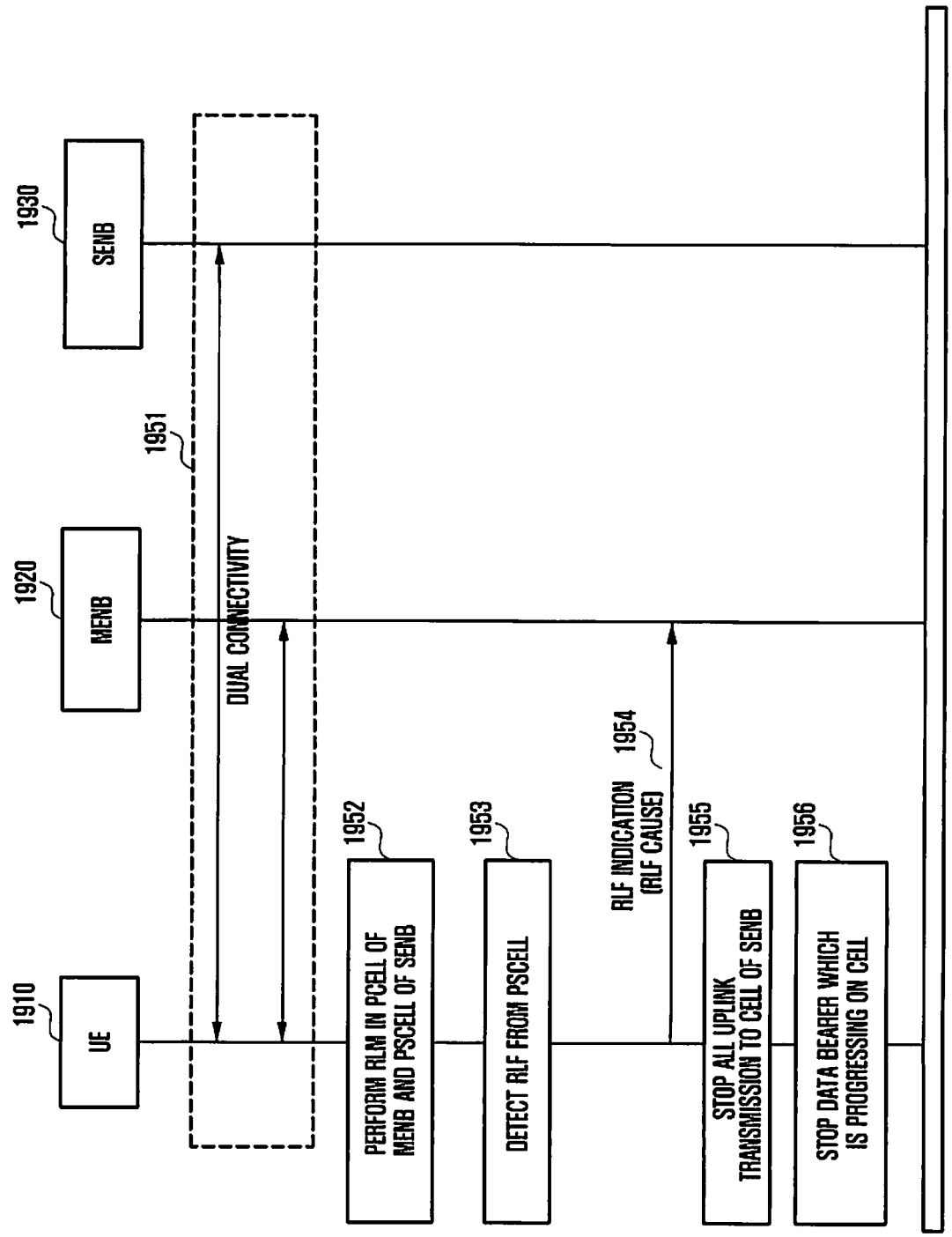
FIG. 19 is a flowchart illustrating the operation of transmitting the RLF indication by the UE and the MeNB, according to another embodiment of the present invention.

FIG. 19 is a flowchart illustrating the operation of transmitting the RLF indication by the UE and the MeNB, according to another embodiment of the present invention.

Referring to FIG. 19, a UE 1910 is dually connected to an MeNB 1920 and an SeNB 1930, in step 1951. Further, the UE 1910 performs the RLM in a PCell of the MeNB 1920 and one cell of the SeNB 1930 configured as a pathloss reference. The cell configured as the pathloss reference may be referred to as a pSCell of the SeNB 1930, or a special cell.

When the UE 1910 detects the RLF in the pSCell, in step 1953, the UE 1910 transmits an RLF indication, including RLF cause information, to the PCell of the MeNB 1920, in step 1954. After transmitting the RLF indication, the UE 1910 stops all uplink transmission including the configured PUCCH, in step 1955, and stops a data radio bearer, which is working in the cell from which the RLF is detected, in step 1956. In some embodiments of the present invention, the PUCCH may be configured in the cell that has been configured as the pathloss reference.

According to another embodiment of the present invention, the RLF indication for one link may be transmitted to the MeNB through the other good link at the following time points:

1. Before RLF is declared (before T310 expires)
  a. RLF expected indication
2. When RLF is declared (when T310 expires)
  a. RLF expected indication When the indication for the RLF state is received, the MeNB may prepare an alternative cell, which can provide a service to the UE on behalf of a cell that is expected to have the RLF (or which has the already generated RLF). Accordingly, a connection re-establishment can be prevented.

Figure 4:
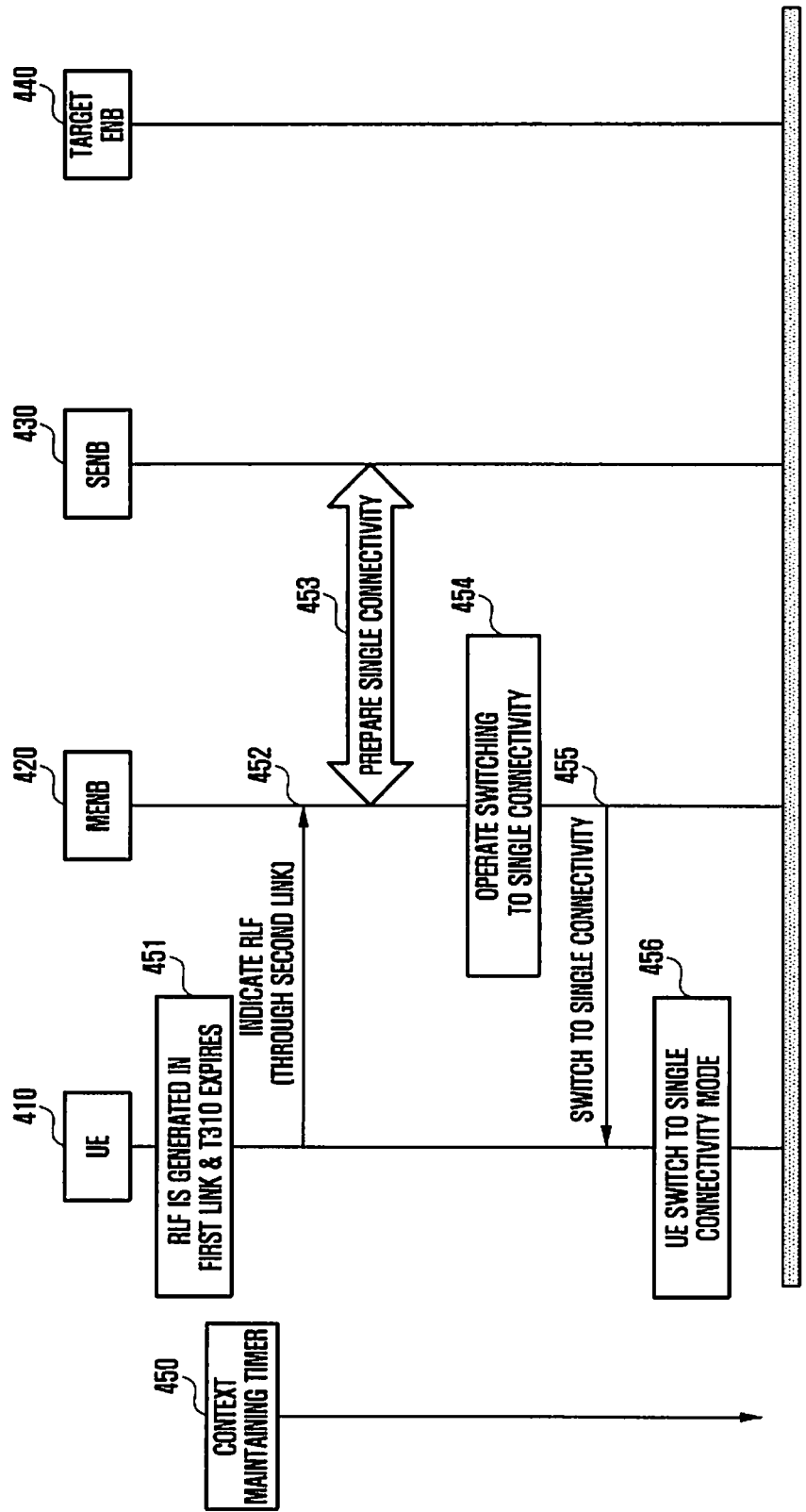
FIG. 4 is a flowchart illustrating a method of handling the RLF in dual connectivity, according to an embodiment of the present invention.

FIG. 4 is a flowchart illustrating a method of handling the RLF in the dual connectivity, according to an embodiment of the present invention.

Referring to FIG. 4, when the RLF is declared in the dual connectivity, the dual connectivity may be replaced with the single connectivity to an eNB having a good link.

When the RLF of one of the two radio links is declared (for example, when the timer T310 expires), a result thereof may be notified to the MeNB through a second link (that is, a link having a good connection state). Further, the MeNB may prepare an eNB having a good link to provide a service to the UE in the single connectivity mode and operate the UE to perform switching to the single connectivity mode.

Specifically, the RLF for the first link is generated, in step 451. For example, when the timer T310 expires, the RLF may be declared.

Thereafter, in step 452, a UE 410 transmits an RLF message to an MeNB 420. At this time, the RLF message may be transmitted to the MeNB 420 through the second link having a good connection state.

In some embodiments of the present invention, the UE 410 may transmit a message, including an indication indicating that the RLF has been already generated, to the MeNB 420. At this time, in some embodiments of the present invention, the RLF indication may be defined as a new indication.

Alternatively, in some embodiments of the present invention, the UE 410 may transmit a legacy message RRC connection re-establishment message to the MeNB 420 through the second link. The RRC connection re-establishment message may be the same as that transmitted in 3GPP LTE when the timer T310 expires. For example, a Random Access CHannel (RACH) code may be given to the UE 410 for such a purpose. At this time, the transmitted RRC connection re-establishment message may be dealt with like the RLF indication.

As illustrated in step 450, L2/L3 context for the first link may be maintained for a preset period. The L2/L3 context is required to be maintained for a predetermined period to prepare the single connectivity replacement. Then, the L1 context for the first link may be released.

Thereafter, in step 453, the MeNB 420 communicates with an SeNB 430 to have the UE 410 ready to switch to the single connectivity between the UE 410 and an eNB having a good link.

For example, while the radio link of the MeNB 420 is in a good state, the radio link of the SeNB 430 may be in an RLF state. At this time, the MeNB 420 may allow the UE 410 to switch to the single connectivity with the MeNB 420, instead of the dual connectivity with both the MeNB 420 and the SeNB 430. At this time, context of the flow serviced by the SeNB 430 is required to be transferred to the MeNB 420. A detailed description thereof is set forth below.

The MeNB 420 operates to switch to the single connectivity, in step 454, and transmits a single connectivity switching message to the UE 410, in step 455. At a this time, flow information changed in step 453 may be also transferred.

Thereafter, the UE 410 performs switching to the single connectivity with the eNB having a good link, in step 456.

In an embodiment of the present invention described in connection with FIG. 4, the handling of the RLF in the link of the SeNB 430 may be delayed, and thus, the link of the SeNB 430 is in the RLF state. This embodiment of the present invention may be suitable for the RLF scenario 1b corresponding to a case where the link of the MeNB 420 is good, but is not limited thereto.

Figure 5:
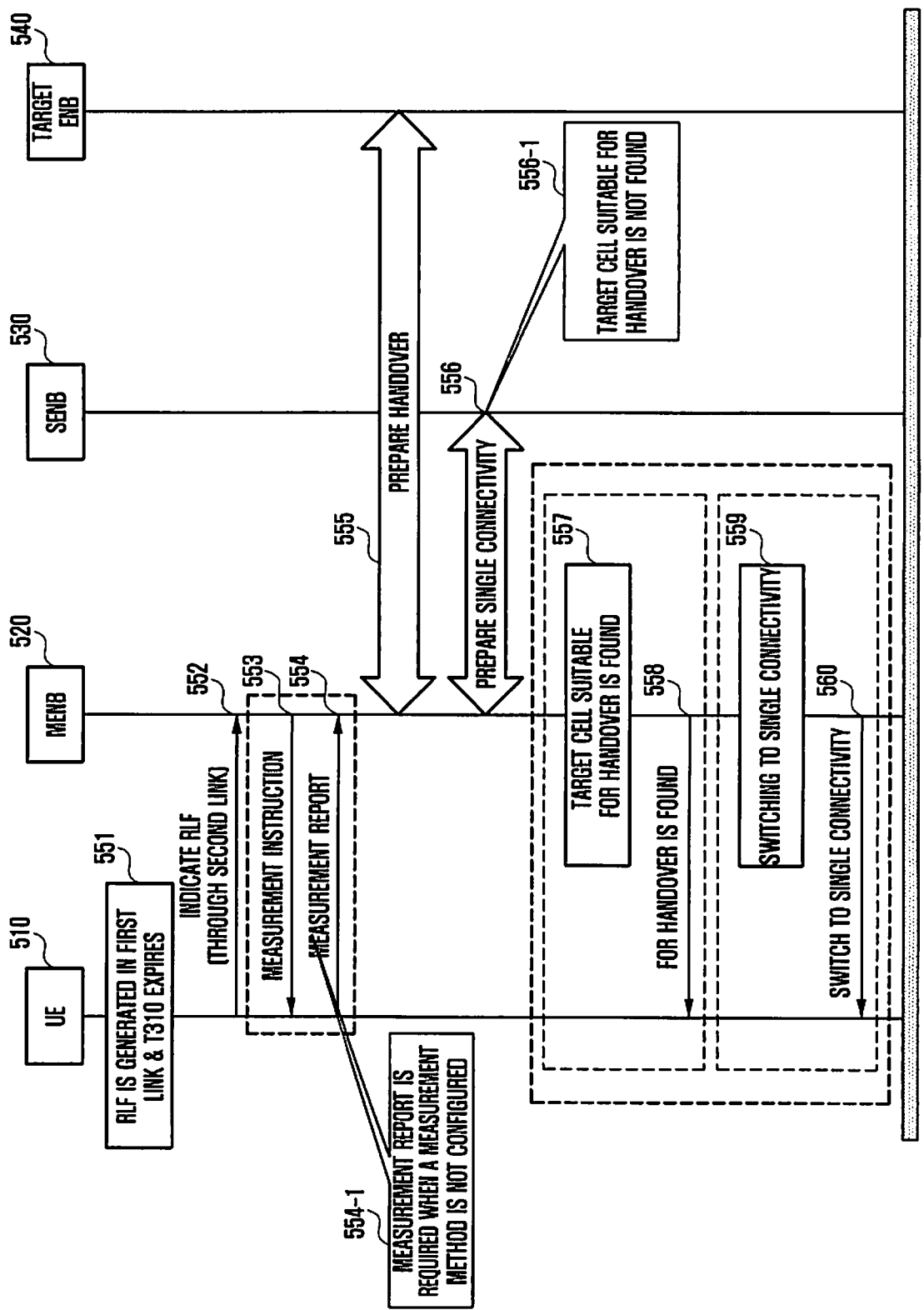
FIG. 5 is a flowchart illustrating a method of handling the RLF in dual connectivity, according to another embodiment of the present invention.

FIG. 5 is a flowchart illustrating the handling method when the RLF is generated in the dual connectivity, according to another embodiment of the present invention.

Referring to FIG. 5, a UE 510 transmits an RLF message to an MeNB 520 through a good link after the RLF timer T310 expires to enable the MeNB 520 to prepare an alternative cell for providing a service to the UE 510 in the dual connectivity.

The MeNB 520, having received the RLF message, identifies whether there is a proper target cell 540 that can be prepared for a handover. When there is no proper target cell 540, the MeNB 520 determines and prepares the proper target cell 540 for the handover by performing proper measurement. Further, the MeNB 520 instructs the UE 510 to hand over to the prepared proper target cell 540.

When the MeNB 520 finds no proper target cell for the handover, the MeNB 520 prepares an eNB corresponding to a good link, through which a service is provided, to the UE 510 in the single connectivity mode. Further, the MeNB 520 may instruct the UE 510 to switch to the single connectivity mode with the selected eNB.

Specifically, in step 551, the RLF for a first link is generated. For example, when the timer T310 expires, the RLF may be declared.

Thereafter, in step 552, the UE 510 transmits an RLF message to the MeNB 520. At this time, the RLF message may be transmitted to the MeNB 520 through a second link having a good connection state. In order to perform the handover or prepare switching to the single connectivity, it is required to retain the L2/L3 context for the first link for a preset time period and a new timer, such as a context retention timer, is needed to retain the L2/L3 context. Meanwhile, the L1 context for the first link is released.

In some embodiments of the present invention, the UE 510 may transmit a message including an indication indicating that the RLF has been already generated to the MeNB 520. At this time, the RLF indication may be defined as a new indication.

Alternatively, in some embodiments of the present invention, the UE 510 may transmit a legacy message RRC connection re-establishment message to the MeNB 520 through the second link. The RRC connection re-establishment message may be the same as that transmitted in 3GPP LTE when the timer T310 expires. For example, an RACH code may be given to the UE 510 for such a purpose. The transmitted RRC connection re-establishment message may be dealt with like the RLF indication. Accordingly, the RRC connection re-establishment message corresponding to the RLF indication may alternatively identify a link in which the RLF is generated.

Thereafter, when the MeNB 520 does not have an effective recent measurement report from the UE 510, the MeNB 520 transmits a measurement instruction to the UE 510, in step 553. However, as illustrated in step 554-1, for example, when the MeNB 520 already has the still effective recent measurement report from the UE 510, the measurement may not be required. In step 554, the UE 510 transmits the measurement report to the MeNB 520 by performing the measurement according to the measurement instruction of the MeNB 520.

At this time, in some embodiments of the present invention, when the MeNB 520 receives the RLF indication, the MeNB 520 may configure a one shot measurement. Alternatively, in some embodiments of the present invention, when the MeNB 520 receives the RLF indication, the MeNB 520 may configure a one shot measurement if the first link is a macro link, and may configure normal measurement if the first link is not the macro link.

The MeNB 520 receives the measurement report from the UE 510, in step 554. Alternatively, when the MeNB 520 already has the effective measurement report, the MeNB 520 prepares a cell for the handover, in step 555. At this time, the MeNB 520 prepares a target eNB 540 suitable for the handover by the UE 510 based on the measurement report. The target eNB 540 may be a pico eNB but is not limited thereto, and may be a macro eNB.

Meanwhile, when the target cell suitable for the handover is not found as illustrated in step 556-1, the MeNB 520 communicates with an SeNB 530 to have the UE 510 ready to switch to the single connectivity between the UE 510 and an eNB having a good link, in step 556.

At this time, in some embodiments of the present invention, the MeNB 20 may select one target cell 540 suitable for the handover by the UE 510 from among a plurality of cells based on the measurement report. However, when the suitable cell is not found, the MeNB 520 may prepare a second eNB for the single connectivity mode. For example, while the radio link of the MeNB 520 is in a good state, the radio link of the SeNB 530 may be in an RLF state. At this time, the MeNB 520 may allow the UE 510 to switch to the single connectivity with the MeNB 520, instead of the dual connectivity with both the MeNB 520 and the SeNB 530. Context of the flow serviced by the SeNB 530 is required to be transferred to the MeNB 520. A detailed description thereof is set forth below.

Alternatively, in some embodiments of the present invention, the MeNB 520 may select one target cell 540 suitable for the handover by the UE 510 from among a plurality of cells based on the measurement report. However, when the suitable cell is not found, the MeNB 520 may prepare an alternative cell for the handover. The alternative cell may be semi-statically determined by the MeNB 520 and/or the SeNB 530. Alternatively, in some embodiments of the present invention, the alternative cell may be dynamically designated by a first eNB as the MeNB 520. Thereafter, when no cell is configured as the alternative cell, the MeNB 520 may prepare a second eNB for the single connectivity mode. At this time, as described above, the context of the flow serviced by the first eNB is required to be transferred to the second eNB. A detailed description thereof is set forth below.

When the MeNB 520 prepares the target cell 540 suitable for the handover of step 555, in step 557, the MeNB 520 instructs the UE 510 to hand over to the prepared target cell 540, in step 558. For example, the MeNB 520 may transmit a handover instruction to the UE 510. At this time, the handover instruction may be transmitted through the second link having a good connection state. In some embodiments of the present invention, the prepared target cell 540 may be at least one of a cell from the measurement report transmitted by the UE 510, an alternative cell, and second eNBs having good links.

Meanwhile, when the MeNB 520 does not select the target cell 540 suitable for the handover, the MeNB 520 operates to switch to the single connectivity with the second eNB, in step 559, and transmits a single connectivity switching message to the UE 510, in step 560. At this time, flow information changed in step 556 may be also transferred.

In an embodiment of the present invention described in connection with FIG. 5, the handling of the RLF in the link of the SeNB 530 may be delayed, and thus, the link of the SeNB 530 is in the RLF state, and the embodiment may be suitable for the RLF scenario 1b corresponding to a case where the link of the MeNB 520 is good, but is not limited thereto.

Figure 6:
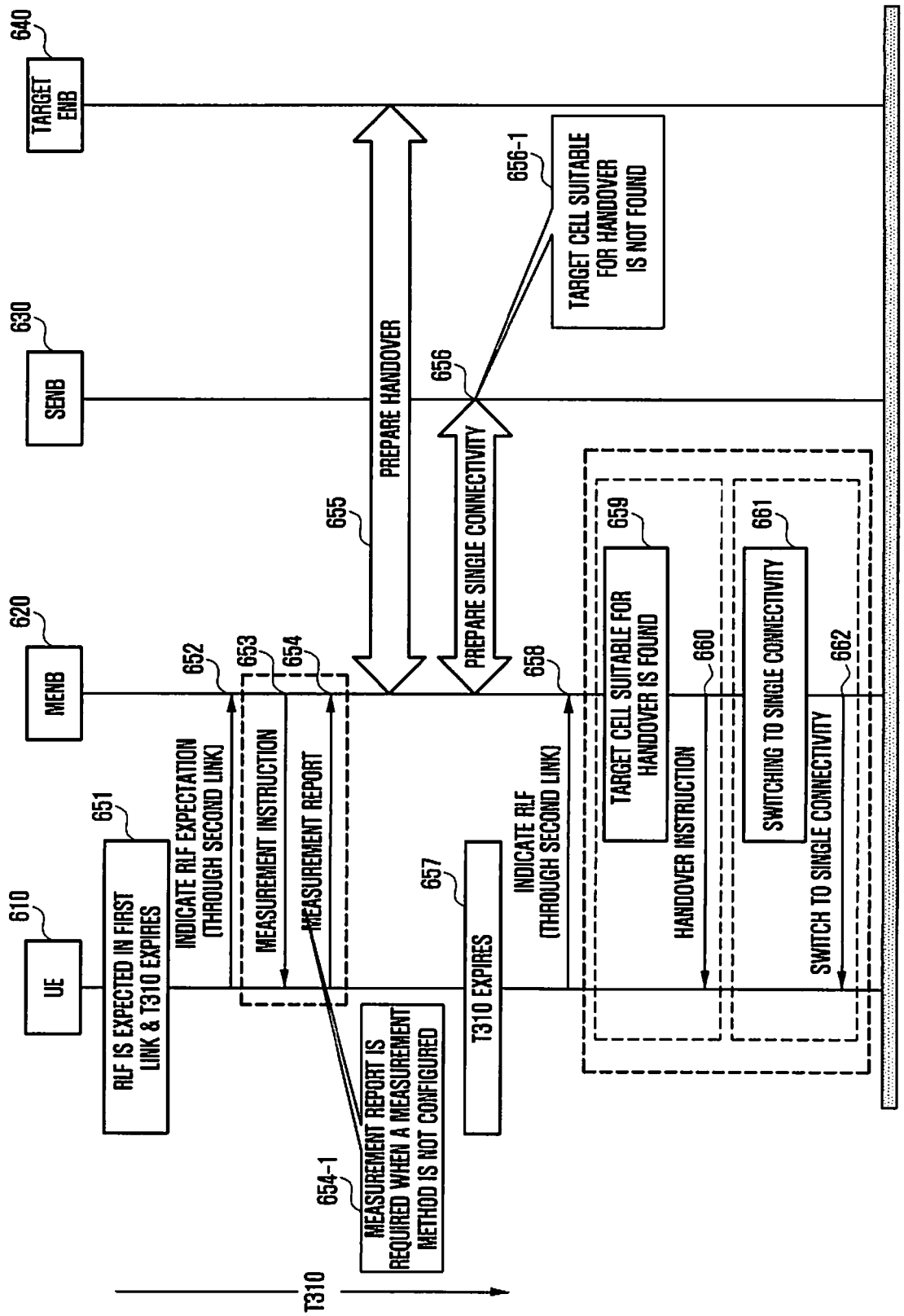
FIG. 6 is a flowchart illustrating a method of handling the RLF in dual connectivity, according to another embodiment of the present invention.

FIG. 6 is a flowchart illustrating a method of handling the RLF in the dual connectivity, according to another embodiment of the present invention.

Referring to FIG. 6, a UE 610 transmits an RLF expected message to an MeNB 620 through a link having a good link connection before the RLF timer T310 expires to enable the MeNB 620 to prepare an alternative cell for providing a service to the UE 610 in the dual connectivity.

The RLF expected message may be transmitted at the time when the RLF timer T310 starts or after a preset time from the start of the RLF timer T310 to secure some time during which initial RLF is restored.

The MeNB 620, having received the RLF expected message, identifies whether there is the suitable target cell 640 that can be prepared for the handover. When there is no suitable target cell 640, the MeNB 520 determines and prepares the suitable target cell 640 for the handover by performing proper measurement. Thereafter, when the RLF is actually generated (for example, when the timer T310 expires), the UE 610 explicitly informs of the generation of the RLF by transmitting a message, such as, for example, the RLF message, to the MeNB 620 through a link having a good link connection. Further, the MeNB 620 instructs the UE 610 to hand over to the prepared target cell 640 based on the detection of the RLF.

When the MeNB 620 finds no suitable target cell 640 for the handover, the MeNB 620 prepares an eNB corresponding to a good link through which a service is provided to the UE 610 in the single connectivity mode. Further, the MeNB 620 instructs the UE 610 to switch to the single connectivity mode with the selected eNB based on the detection of the RLF.

Specifically, in step 651, the RLF for a first link is generated. For example, when the RLF timer T310 starts, the RLF may be expected.

Thereafter, in step 652, the UE 610 transmits the RLF expected message to the MeNB 620. At this time, the RLF expected message may be transmitted to the MeNB 620 through a second link having a good connection state.

In some embodiments of the present invention, the UE 610 may transmit a message including an RLF expected indication indicating that the RLF is expected to the MeNB 620. At this time, in some embodiments of the present invention, the RLF expected indication may be defined as a new indication.

In some embodiments of the present invention, when the timer T310 starts, the UE 610 may transmit the RLF expected message for the first link to the MeNB 620.

Alternatively, in some embodiments of the present invention, when the timer T310 starts, an RLF preparation timer corresponding to a new timer may start. Further, when the RLF preparation timer expires, the UE 610 may transmit the RLF expected message for the first link to the MeNB 620. A length of time of the RLF preparation timer may be shorter than a length of time of the RLF timer T310. Alternatively, when the RLF timer starts, if out-of-sync indications are continuously reported for a preset time, the UE 610 may transmit the RLF expected message to the MeNB 620.

Further, in some embodiments of the present invention, a threshold of a new Reference Signal Received Power (RSRP) may be defined as an RLF report threshold. At this time, when the RLF report threshold is satisfied after the timer T310 starts, the UE 610 may transmit the RLF expected message for the first link to the MeNB 620.

Alternatively, in some embodiments of the present invention, hysteresis may be defined based on the RLF preparation timer and the RLF report threshold. At this time, when an average of the RSRPs for the RLF preparation timer remains below the RLF report threshold, the UE 610 may transmit the RLF expected message for the first link to the MeNB 620.

Further, in some embodiments of the present invention, CQI reports of the first link may be transmitted on the second link and serve as indications of the RLF state. The MeNB 620 and an SeNB 630 may recognize the RLF state based on the reports.

When the MeNB 620 does not have an effective recent measurement report from the UE 610 after receiving the RLF expected message for a related layer, the MeNB 620 transmits a measurement instruction to the UE 610, in step 653. However, as illustrated in step 654-1, for example, when the MeNB 620 already has the still effective recent measurement report from the UE 610, the measurement may not be required. In step 654, the UE 610 transmits the measurement report to the MeNB 620 by performing the measurement according to the measurement instruction of the MeNB 620.

At this time, in some embodiments of the present invention, when the MeNB 620 receives the RLF expected indication, the MeNB 620 may configure a one shot measurement. Alternatively, in some embodiments of the present invention, when the MeNB 620 receives the RLF expected indication, the MeNB 620 may configure a one shot measurement when the first link is a macro link and may configure normal measurement when the first link is not the macro link.

The MeNB 620 receives the measurement report from the UE 510, in step 654. Alternatively, when the MeNB 520 already has the effective measurement report, the MeNB 520 prepares a cell for the handover, in step 655. At this time, the MeNB 620 prepares the target cell 640 suitable for the handover by the UE 610 based on the measurement report. The target cell 640 may be a macro eNB but does not have to be limited thereto, and may be a pico eNB.

Meanwhile, when the target cell suitable for the handover is not found as illustrated, in step 656-1, the MeNB 620 communicates with the SeNB 630 to have the UE 610 ready to switch to the single connectivity between the UE 610 and an eNB having a good link, in step 656.

At this time, in some embodiments of the present invention, the MeNB 620 may select one target cell 640 suitable for the handover by the UE 610 from among a plurality of cells based on the measurement report. However, when the suitable cell is not found, the MeNB 620 may prepare a second eNB for the single connectivity mode. For example, while the radio link of the SeNB 630 is in a good state, the radio link of the MeNB 620 may be in an RLF state. At this time, the MeNB 620 may allow the UE 610 to switch to the single connectivity with the SeNB 630, instead of the dual connectivity with both the MeNB 620 and the SeNB 630. At this time, context of the flow serviced by the MeNB 620 is required to be transferred to the SeNB 630. A detailed description thereof is set forth below.

Alternatively, in some embodiments of the present invention, the MeNB 620 may select one target cell 640 suitable for the handover by the UE 610 from among a plurality of cells based on the measurement report. However, when the suitable cell is not found, the MeNB 620 may prepare an alternative cell for the handover. The alternative cell may be semi-statically determined by the MeNB 620 and/or the SeNB 630. Alternatively, in some embodiments of the present invention, the alternative cell may be dynamically designated by a first eNB as the MeNB 620. Thereafter, when no cell is configured as the alternative cell, the MeNB 620 may prepare a second eNB for the single connectivity mode. At this time, as described above, the context of the flow serviced by the first eNB is required to be transferred to the second eNB. A detailed description thereof is set forth below.

In step 657, the RLF is declared. That is, the timer T310 expires and the RLF may be declared.

Thereafter, in step 658, the UE 610 transmits an RLF message to the MeNB 620. At this time, the RLF message may be transmitted to the MeNB 620 through a second link having a good connection state.

In some embodiments of the present invention, the UE 610 may transmit a message including an indication indicating that the RLF has been already generated to the MeNB 620. At this time, in some embodiments of the present invention, the RLF indication may be defined as a new indication.

Alternatively, in some embodiments of the present invention, the UE 610 may transmit a legacy message Radio RRC connection re-establishment message to the MeNB 620 through the second link. The RRC connection re-establishment message may be the same as that transmitted in 3GPP LTE when the timer T310 expires. For example, an RACH code may be given to the UE 610 for such a purpose. At this time, the transmitted RRC connection re-establishment message may be dealt with like the RLF indication. Alternatively, the MeNB 620 may determine that the RLF is generated in the first link, not the second link through which the RRC connection re-establishment message is received. Accordingly, the RRC connection re-establishment message corresponding to the RLF indication may alternatively identify the link in which the RLF is generated.

At this time, the L2/L3 context is required to be maintained for a predetermined period to prepare the handover or the single connectivity replacement.

When the MeNB 620 prepares a target cell 640 suitable for the handover, in step 659, the MeNB 620 instructs the UE 610 to hand over to the prepared target cell 640, in step 660. For example, the MeNB 620 may transmit a handover instruction to the UE 610. At this time, the handover instruction may be transmitted through the second link having a good connection state. In some embodiments of the present invention, the prepared target cell 640 may be at least one of a cell from the measurement report transmitted by the UE 610, an alternative cell, and second eNBs having good links.

Meanwhile, when the MeNB 620 does not select the target cell 640 suitable for the handover, the MeNB 620 operates to switch to the single connectivity with the second eNB, in step 661, and thus, transmits a single connectivity switching message to the UE 610, in step 662. At this time, flow information changed in step 656 may be also transferred.

In an embodiment of the present invention described in connection with FIG. 6, the handling of the RLF in the link of the MeNB 620 may be delayed, and thus, the link of the MeNB 620 is in the RLF state, and the embodiment may be suitable for the RLF scenario 1a corresponding to a case where the link of the SeNB 630 is good but is not limited thereto.

Figure 7:
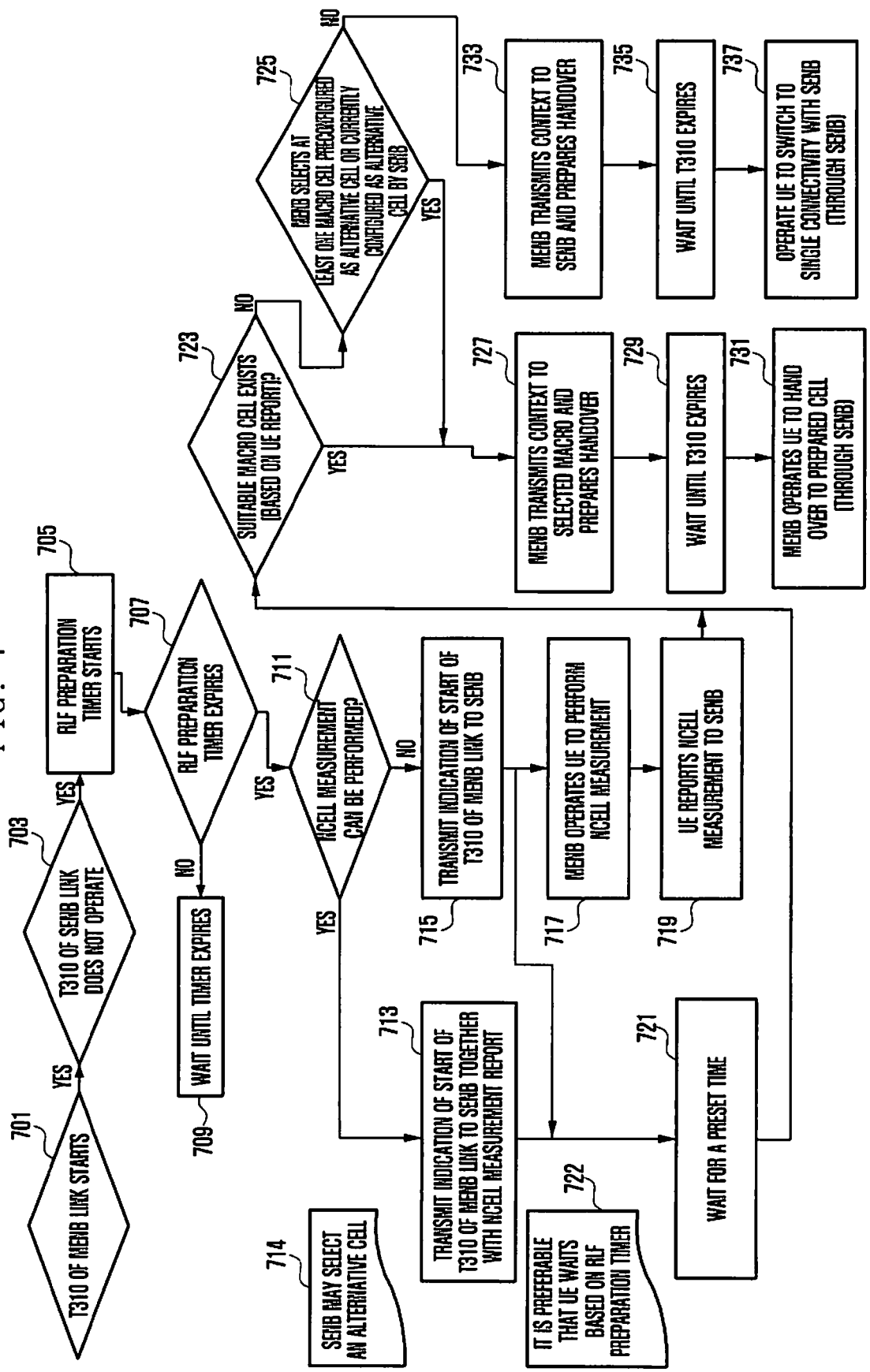
FIG. 7 is a flowchart illustrating a method of handling the RLF of FIG. 6 when a link of a Master eNB (MeNB) corresponds to the RLF, according to an embodiment of the present invention.

FIG. 7 is a flowchart illustrating a method of handling the RLF of FIG. 6 when a link of the MeNB corresponds to the RLF, according to an embodiment of the present invention.

Referring to FIG. 7, in step 701, the UE determines whether the timer T310 of the MeNB link starts. When the timer T310 of the MeNB starts, the UE determines whether the timer T310 of the SeNB does not operate, in step 703. As a result of the determination, when the link of the SeNB is good, an RLF preparation timer starts, in step 705. Thereafter, it is determined whether the RLF preparation timer expires, in step 707. When the RLF preparation timer does not expire, the UE may wait until the RLF preparation timer expires, in step 709.

Thereafter, when the RLF preparation timer expires, the UE determines whether Ncell measurement can be performed, in step 711. As a result of the determination, when the Ncell measurement can be performed, the UE transmits a message including information on the start of the timer T310 of the MeNB link to the SeNB, together with an Ncell measurement report, in step 713. At this time, the SeNB may select an alternative cell, in step 714. Thereafter, in step 721, the UE waits for a preset time. At this time, it is preferable that the UE waits based on the RLF preparation timer.

When the Ncell measurement cannot be performed, the UE transmits a message including information on the start of the timer T310 of the MeNB link, to the SeNB, in step 715. Thereafter, in step 721, the UE waits for a preset time. At this time, it is preferable that the UE waits based on the RLF preparation timer. At this time, the SeNB instructs the UE to perform the Ncell measurement, in step 717. In step 719, the UE reports a result of the performed Ncell measurement to the SeNB.

After step 721 or 719, the eNB determines whether there is a macro cell suitable for a handover based on the measurement result report by the UE, in step 723. When there is no suitable macro cell, it is determined whether the MeNB selects at least one macro cell preconfigured as an alternative cell or currently configured as an alternative cell, by the SeNB, in step 725.

When the suitable macro cell is selected in step 723 or when the MeNB selects the alternative cell as the macro cell in step 725, the MeNB transmits a context to the macro cell and makes preparations for the handover, in step 727. Thereafter, the MeNB waits for the expiration of the timer T310, in step 729. When the timer T310 expires, the MeNB instructs the UE to hand over to the prepared macro cell, in step 731. At this time, the instruction of the handover may be made through the SeNB.

However, when the MeNB does not select the suitable alternative cell as the macro cell, in step 725, the MeNB transmits the context to the SeNB and makes preparations for the handover, in step 733. Thereafter, the MeNB waits for the expiration of the timer T310, in step 735. When the timer T310 expires, the MeNB instructs the UE to switch to the single connectivity with the SeNB, in step 737. At this time, the instruction of switching to the single connectivity may be made through the SeNB.

Figure 8:
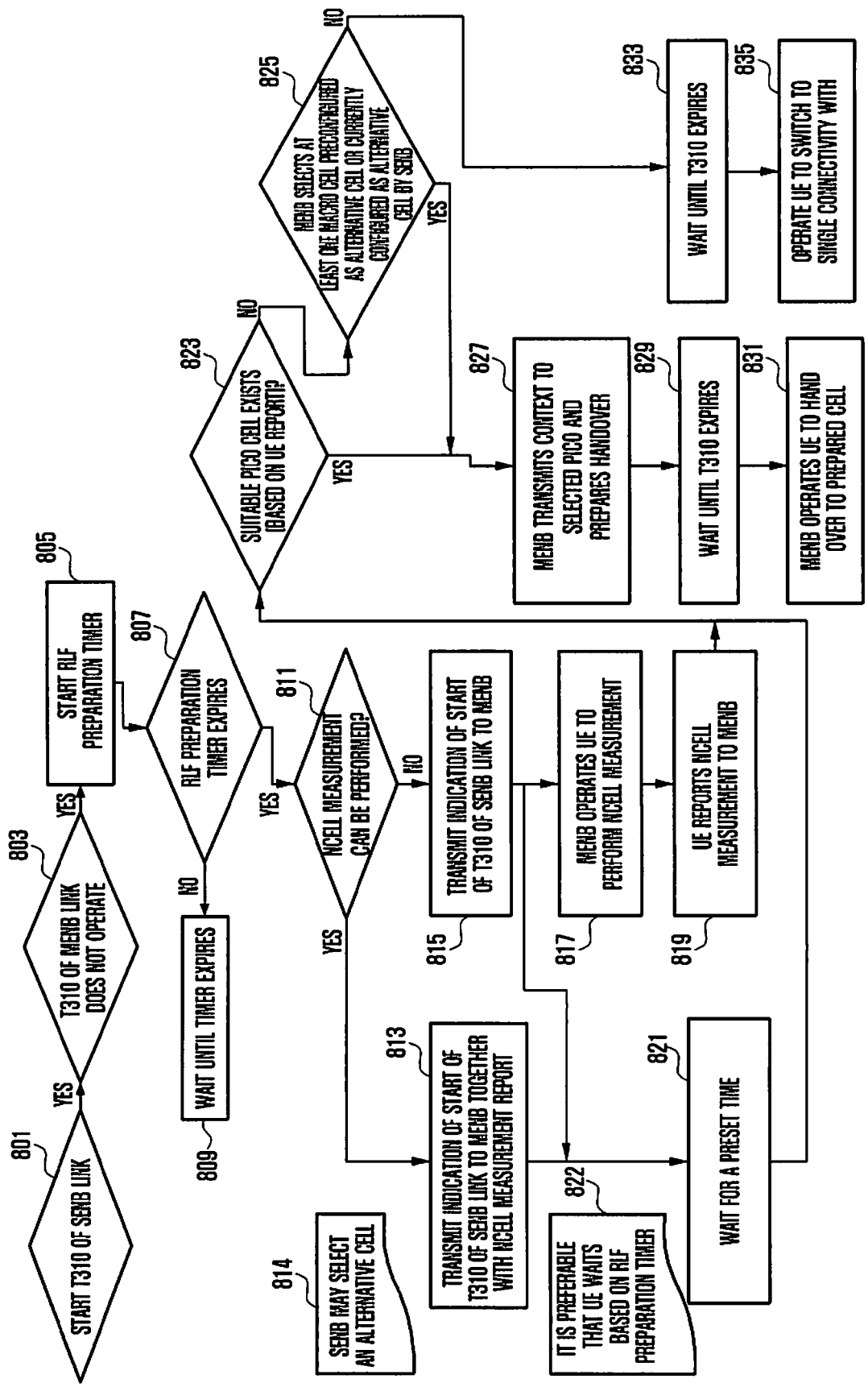
FIG. 8 is a flowchart illustrating a method of handling the RLF of FIG. 6 when a link of a Secondary eNB (SeNB) corresponds to the RLF, according to an embodiment of the present invention.

FIG. 8 is a flowchart illustrating a method of handling the RLF of FIG. 6 when a link of the SeNB corresponds to the RLF, according to an embodiment of the present invention.

Referring to FIG. 8, in step 801, the UE determines whether the timer T310 of the SeNB link starts. When the timer T310 of the SeNB starts, the UE determines whether the timer T310 of the MeNB does not operate, in step 803. As a result of the determination, when the link of the MeNB is good, an RLF preparation timer starts, in step 805. Thereafter, the UE determines whether the RLF preparation timer expires, in step 807. When the RLF preparation timer does not expire, the UE waits until the RLF preparation timer expires, in step 809.

Thereafter, when the RLF preparation timer expires, the UE determines whether Ncell measurement can be performed, in step 811. As a result of the determination, when the Ncell measurement can be performed, the UE transmits a message including information on the start of the timer T310 of the SeNB link to the MeNB, together with an Ncell measurement report, in step 813. At this time, the SeNB may select an alternative cell in step 814. Thereafter, in step 821, the UE waits for a preset time. At this time, it is preferable that the UE waits based on the RLF preparation timer.

When the Ncell measurement cannot be performed, the UE transmits a message including information on the start of the timer T310 of the MeNB link, to the MeNB, in step 815. Thereafter, in step 821, the UE waits for a preset time. At this time, it is preferable that the UE waits based on the RLF preparation timer. At this time, the MeNB instructs the UE to perform the Ncell measurement, in step 817. In step 819, the UE reports a result of the performed Ncell measurement to the MeNB.

After step 821 or 819, the eNB determines whether there is a pico cell suitable for a handover based on the measurement result report by the UE, in step 823. When there is no suitable pico cell, it is determined whether the MeNB selects at least one pico cell preconfigured as an alternative cell or currently configured as an alternative cell, by the SeNB, in step 825.

When the suitable pico cell is selected in step 823 or when the MeNB selects the alternative cell as the pico cell in step 825, the MeNB transmits a context to the selected pico cell and makes preparations for the handover, in step 827. At this time, the same process may be performed in the SeNB. Thereafter, the MeNB waits for the expiration of the timer T310, in step 829. When the timer T310 expires, the MeNB instructs the UE to hand over to the prepared pico cell, in step 831.

However, when the MeNB does not select the suitable alternative cell as the pico cell in step 825, the MeNB waits until the timer T310 expires, in step 833. When the timer T310 expires, the MeNB instructs the UE to switch to the single connectivity with the SeNB, in step 835.

The embodiments of the present invention for handling the RLF described in FIGS. 4 to 8 may be generalized by the multi-eNB configuration in which the UE is connected to a plurality of eNBs and one of the eNBs operates as the MeNB. For example, in the embodiment for handling the RLF described in FIG. 6 (preparing the initial RLF), when the UE reports the RLF expected in one link connected to the MeNB, the MeNB may prepare another cell to handle flows serviced by an eNB having a link in an RLF state. An alternative cell selected by the preparation may be one cell in a set of existing cells providing a service to the UE or a new cell that is not included in the set of cells providing the service to the UE. Similarly, the embodiment for handling the RLF described in the part related to FIGS. 4 and 5 may be applied to the multi-eNB configuration.

In some embodiments of the present invention, the eNB having received the RLF expected message may prepare one or more cells for the handover. This can prepare many more cells for the re-establishment, and thus, increase chances that the UE selects the prepared cells for the re-establishment, thereby increasing a success rate of the re-establishment. In another embodiment of the present invention, the RLF expected message may be transmitted once or more.

The RLF message in the above described embodiments may be a new layer 2 or 3 message, an information element in the existing message, or a layer 1 level signal for a faster and stronger indication. For example, an RACH code may be given to the UE for such a purpose. Alternatively, in some embodiments of the present invention, a legacy connection re-establishment request may be used for the RLF message. The MeNB may determine which link is in the RLF state based on the link through which the connection re-establishment request is received.

In the above described embodiments of the present invention, it has been described that the RLF is triggered based on the expiration of the timer T310. However, the above described embodiments can be equally applied to the RLF trigger by a different cause such as, for example, the RLF including RACH failure on the SeNB or RLC failure on the SeNB.

According to an embodiment of the present invention, the RLF indication may include a RLF cause value. The RLF cause may include at least one of the expiration of the timer T310, the failure of the RACH on the SeNB, and the failure of an RLC layer on the SeNB. The random access may be supported by one of the cells of the SeNB.

Figure 20:
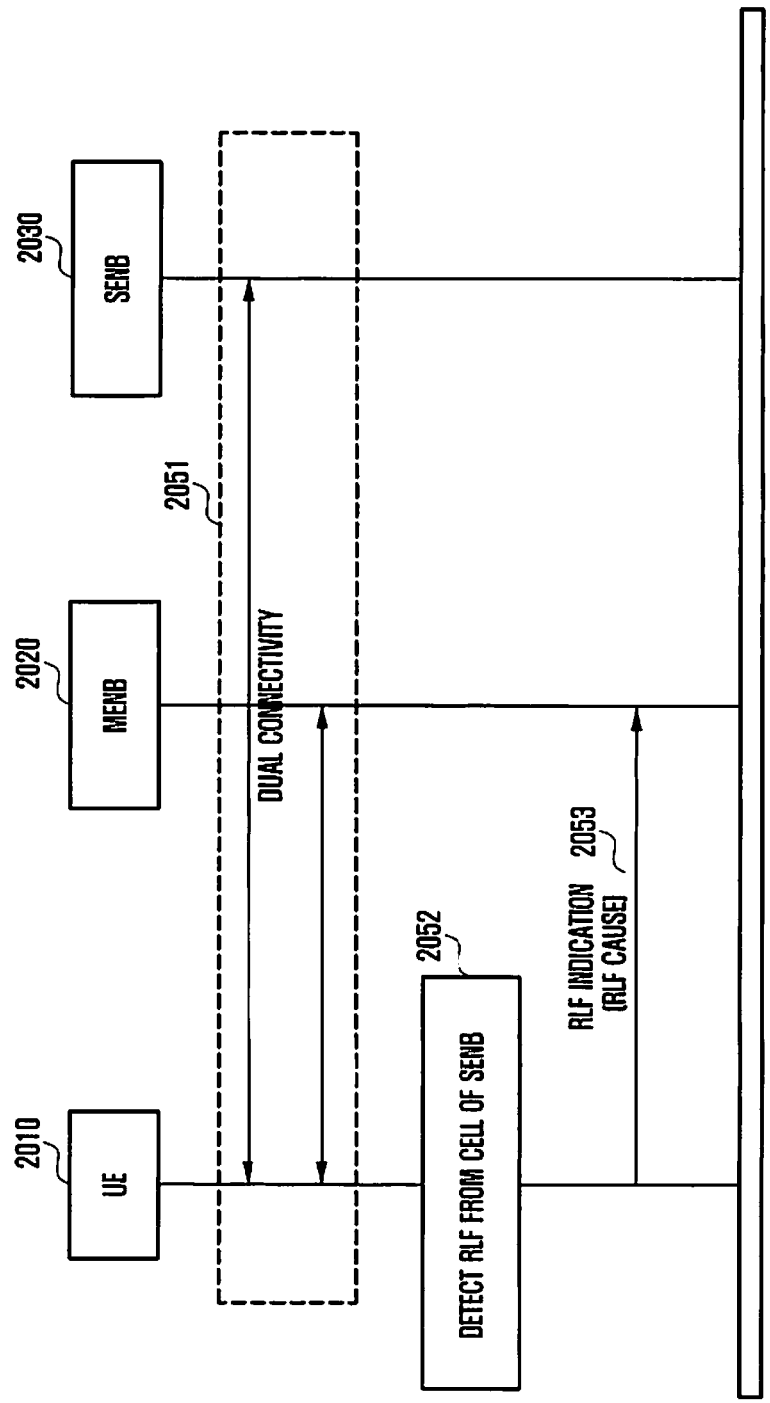
FIG. 20 is a flowchart illustrating a method of transmitting an RLF indication including an RLF cause value, according to an embodiment of the present invention.

FIG. 20 is a flowchart illustrating of a method of transmitting an RLF indication including an RLF cause value, according to an embodiment of the present invention.

Referring to FIG. 20, a UE 2010 is dually connected to an MeNB 2020 and an SeNB 2030, in step 2051. At this time, for example, when a random access fails, the SeNB 2030 cannot know of the failure. Similarly, when the maximum number of re-transmissions is made in a cell of the SeNB 2030, the RLF is required to be triggered. The RLF is triggered in all scenarios, such as, for example, the RLF due to L1 out-of-sync, the RACH failure of the SeNB, or the RLC failure of the SeNB during a preset time period (for example, T310). Further, in order to allow the MeNB to perform a proper operation, the information is transmitted to the dually connected MeNB, in step 2053. Further, when the RLF is detected from the link of the SeNB, in step 2052, the UE may stop all uplink transmission, such as CQI/SR/SRS, as soon as possible in order to prevent the generation of unnecessary uplink interference.

For example, an IE may be defined as follows to identify a cause of the RLF on the SeNB.

SeNB-RLF-Cause ENUM {T310 Expiry, RACH Failure, RLC Failure}

In an alternative embodiment of the present invention, the RLF indication may include a cause value. The cause may include the RACH failure on the SeNB and the RLC failure on the SeNB.

For example, an IE may be defined as follows to identify a cause of the RLF on the SeNB.

SeNB-RLF-Cause ENUM {RACH Failure, RLC Failure}

In another alternative embodiment of the present invention, when the RLFs are simultaneously generated, SeNB-RLF-Cause IE may express multiple types of the RLF. For example, an IE may be defined as follows to identify a cause of the RLF on the SeNB.

SeNB-RLF-Cause ENUM {T310 Expiry, RACH Failure, RLC Failure, T310 Expiry & RACH Failure, RACH Failure & RLC Failure, T310 Expiry & RLC Failure, T310 Expiry & RACH Failure & RLC Failure}

In such a case, in some embodiments of the present invention, SeNB-RLF-Cause IE itself may be considered as the RLF indication.

In some embodiments of the present invention, the IE may be included within the existing RRC message. Alternatively, a new RRC message may be made to carry the IE.

Figure 21:
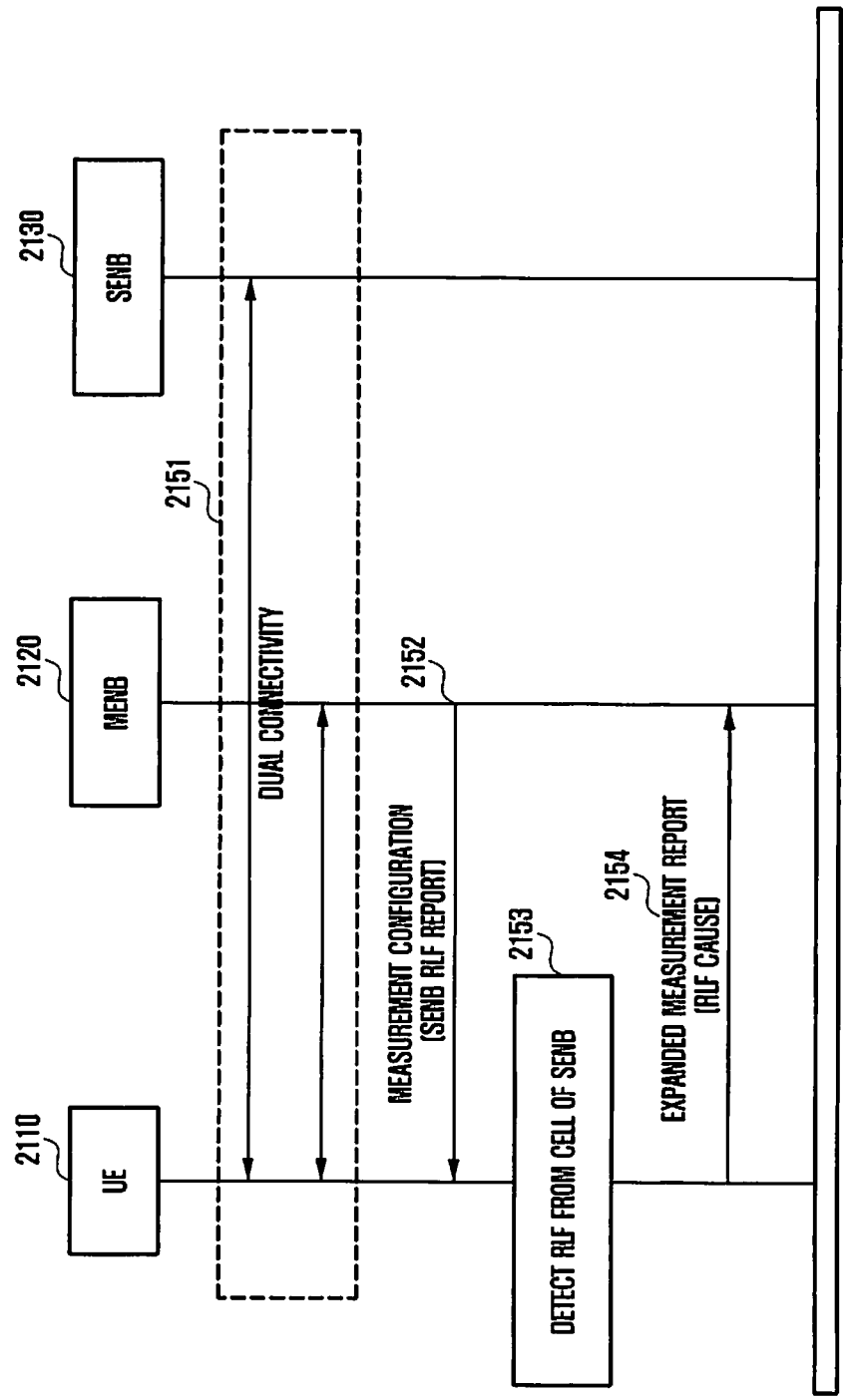
FIG. 21 is a flowchart illustrating a method of transmitting an RLF indication included in a measurement report configuration, according to an embodiment of the present invention.

FIG. 21 is a flowchart illustrating a method of transmitting an RLF indication included in a measurement report configuration, according to an embodiment of the present invention.

Referring to FIG. 21, a UE 2110 is dually connected to an MeNB 2120 and an SeNB 2130, in step 2151. At this time, when the UE 2110 detects the RLF from a cell of the SeNB 2130, in step 2153, the UE 2110 may insert cause information (for example, SeNB-RLF-cause IE) of the RLF into a measurement report and transmit the measurement report to the MeNB 2120, in step 2154. At this time, the MeNB 2120 may retransmit a message for a measurement configuration to report the RLF of the SeNB 2130 to the UE 2110, in step 2152.

Meanwhile, in some embodiments of the present invention, a new expanded measurement report may be generated to include the cause information of the RLF. In this case, when the UE 2110 detects the RLC from the cell of the SeNB 2130 in step 2153, the UE 2110 may transmit the expanded measurement report including SeNB-RLF-Cause IE that indicates the cause of the RLF to the MeNB 2120, in step 2154. At this time, when the UE 2110 detects the RLF from the cell of the SeNB, the expanded measurement report may be configured to be transmitted by the (master) eNB, in step 2152.

Figure 22:
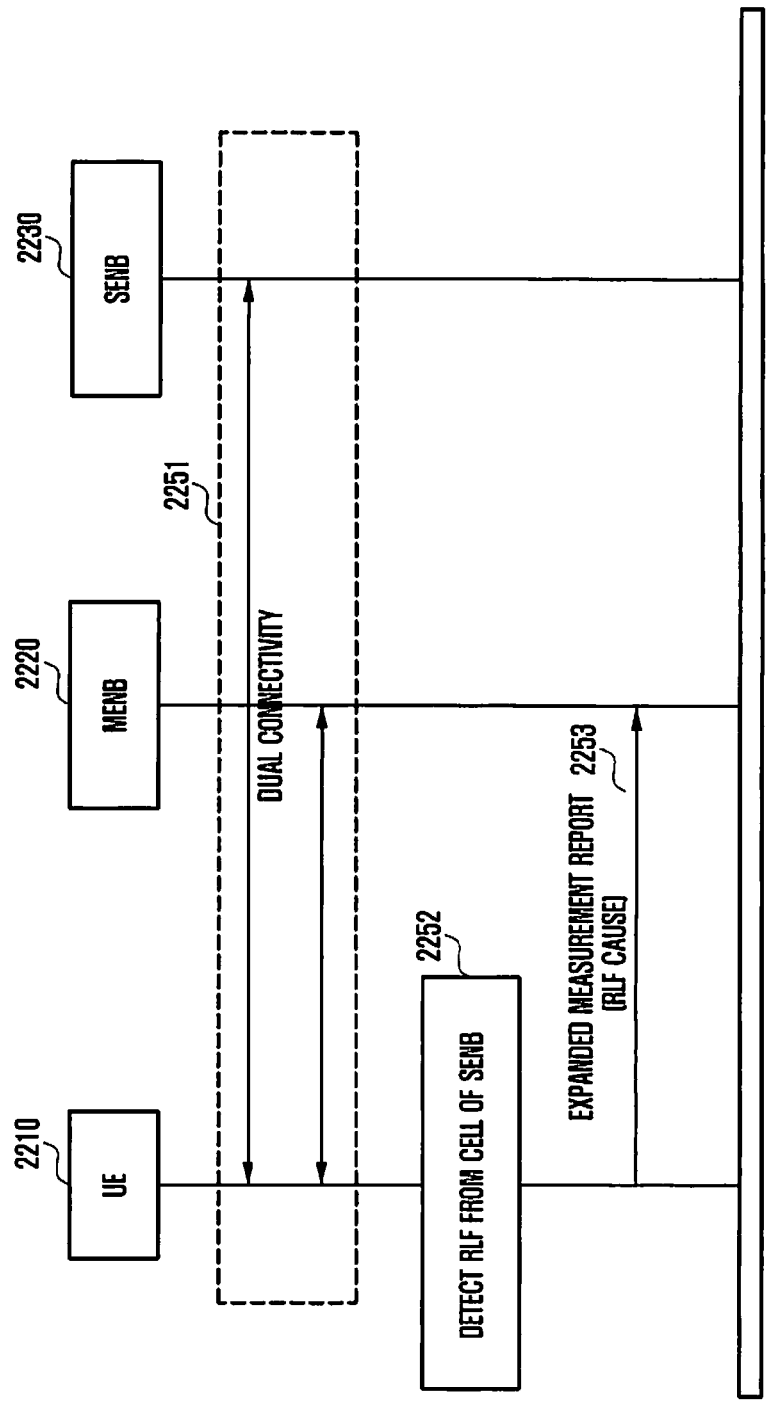
FIG. 22 is a flowchart illustrating the method of transmitting the RLF indication included in the measurement report configuration, according to another embodiment of the present invention.

FIG. 22 is a flowchart illustrating a method of transmitting an RLF indication included in a measurement report configuration, according to an embodiment of the present invention.

Referring to FIG. 22, a UE 2210 is dually connected to an MeNB 2220 and an SeNB 2230, in step 2251. In this case, when the UE 2210 detects the RLF from a cell of the SeNB 2230, in step 2252, the UE 2210 may always transmit an expanded measurement report to the MeNB 2220, in step 2253. The embodiment related to FIG. 22 does not require the measurement configuration, unlike the embodiment described in the part related to FIG. 21. When the UE 2210 detects the RLC from the cell of the SeNB 2230, in step 2252, the UE 2210 may prepare the expanded measurement report including information on the cause of the RLF (for example, SeNB-RLF-Cause IE). At this time, in some embodiments of the present invention, the expanded measurement report may include measurement results of a serving cell and neighboring cells if possible. Further, the UE 2210 may transmit the expanded measurement report to the MeNB 2220, in step 2253.

Meanwhile, in some embodiments of the present invention, an RRCConnectionReestablishmentRequest may be used to indicate the RLF of the SeNB and the failure cause thereof. At this time, a spare field of ReestablishmentCause may be used as a signal of the RLF indication of the SeNB. A detailed description thereof is set forth below. As soon as the MeNB receives the RRCConnectionReestablishmentRequest, the MeNB may determine whether the RRCConnectionReestablishmentRequest is made according to the RLC of the SeNB based on the ReestablishmentCause. Further, the MeNB may perform a proper operation instead of processing the RRCConnectionReestablishmentRequest message according to a legacy manner. Alternatively, when a physCellId field corresponding to a PUCCH corresponds to the cell of the SeNB, the MeNB may use a re-establishment request to indicate the RLF of the SeNB. In another embodiment of the present invention, the SeNB-RLF-Cause IE may be included in the RRCConnectionReestablishmentRequest to clearly indicate the cause of the RLF of the SeNB. Only when the RRCConnectionReestablishmentRequest is used to indicate the RLF of the SeNB, the IE may be included in the RRCConnectionReestablishmentRequest.

For example, messages may be configured as shown in Table 1 below.

TABLE 1

```
-- ASN1START
RRCConnectionReestablishmentRequest ::= SEQUENCE {
    criticalExtensions              CHOICE {
        rrcConnectionReestablishmentRequest-r8
        RRCConnectionReestablishmentRequest-r8-IEs,
        criticalExtensionsFuture    SEQUENCE { }
    }
}
RRCConnectionReestablishmentRequest-r8-IEs ::= SEQUENCE {
    ue-Identity                     ReestabUE-Identity,
    reestablishmentCause            ReestablishmentCause,
    spare                           BIT STRING (SIZE (2))
}
ReestabUE-Identity ::=              SEQUENCE {
    c-RNTI                          C-RNTI,
    physCellId                      PhysCellId,
    shortMAC-I                      ShortMAC-I
}
ReestablishmentCause ::=            ENUMERATED {
    reconfigurationFailure, handoverFailure,
    otherFailure, SeNB-RLF}
-- ASN1STOP
```

Meanwhile, in another embodiment of the present invention, the UE may inform the MeNB of an RLF state generated in the SeNB by transmitting a UE assistance information (UEAssistanceInformation) message to the MeNB. At this time, the UE assistance information message, which the UE transmits to the MeNB, may include one or more of a cause of the RLF generated in the SeNB, that is, the physical layer failure, the RACH failure, and the RLC failure.

The UE may perform an RLM operation on at least one cell of the SeNB in which an uplink control channel, that is, a PUCCH, is configured. The RLM operation on the cell of the SeNB may be performed in the same way as that of the RLM operation on the MeNB in which the PUCCH is configured, that is, a PCell. Further, at this time, parameters such as T310, N310, N311 and the like may be used. When the UE performs the RLM operation, and thus, detects the RLF of the SeNB, the UE may stop uplink transmission for all cells of the corresponding SeNB and inform the MeNB that the RLF is generated in the SeNB by transmitting a UE assistance information message to the MeNB. The UE assistance information a message may include a cause of the RLF generated in the SeNB. Specifically, the UE assistance information message may be as shown in Table 2 below.

TABLE 2

```
UEAssistanceInformation message
-- ASN1START
UEAssistanceInformation-r11 ::=               SEQUENCE {
    criticalExtensions                        CHOICE {
        c1                                    CHOICE {
            ueAssistanceInformation-r11
            UEAssistanceInformation-r11-IEs,
            spare3 NULL, spare2 NULL, spare1 NULL
        },
        criticalExtensionsFuture              SEQUENCE { }
    }
}
UEAssistanceInformation-r11-IEs ::=           SEQUENCE {
    powerPrefIndication-r11                   ENUMERATED {normal,
lowPowerConsumption} OPTIONAL,
    lateNonCriticalExtension                  OCTET STRING
        OPTIONAL,
    nonCriticalExtension                      UEAssistanceInformation-r12-IEs
        OPTIONAL
}
UEAssistanceInformation-r12-IEs ::=           SEQUENCE {
    SCGRLFCause                               ENUMERATED {
                                                  t310-Expiry,
    randomAccessProblem,
                                                  rlc-MaxNumRetx, spare1}
        OPTIONAL,
    lateNonCriticalExtension                  OCTET STRING
        OPTIONAL,
    nonCriticalExtension                      SEQUENCE { }
        OPTIONAL
}
-- ASN1STOP
UEAssistanceInformation field descriptions
powerPrefIndication
Value lowPowerConsumption indicates the UE prefers a configuration that
is primarily optimised for power saving. Otherwise the value is set to
normal.
SCGRLFCause
This field is used to indicate the cause of the last radio link failure
that was detected.on PScell.
```

Figure 23:
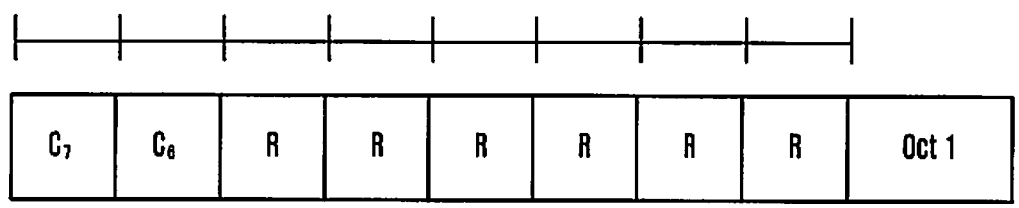
FIGS. 23 to 25 are diagrams illustrating MAC CE, according to an embodiment of the present invention.
Figure 24:
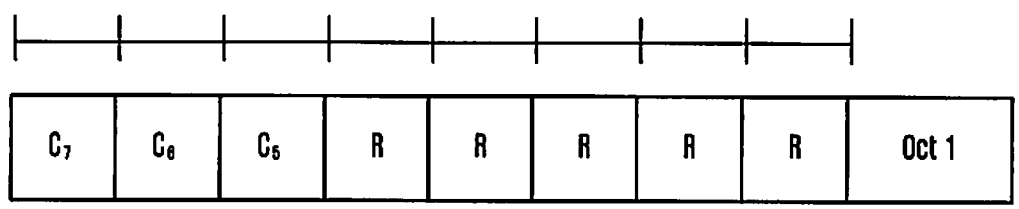
Figure 25:
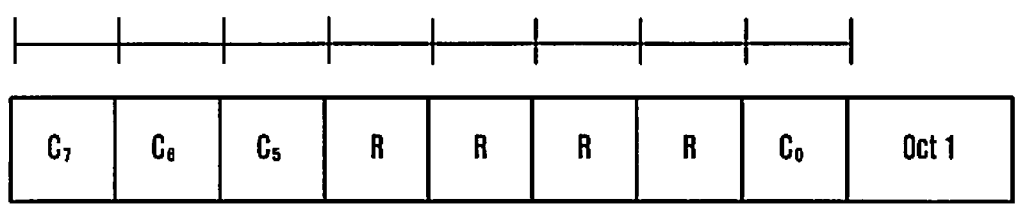

FIGS. 23 to 25 are diagrams illustrating MAC CE, according to an embodiment of the present invention.

In some embodiments of the present invention, an RLF indication having a cause value of the RLF may be defined by a new message or a new MAC CE. Alternatively, the RLF indication having the cause value of the RLF may be added as a new information element within the existing message. An identifier of a cell may be identified together with the RLF indication. When the RLF indication does not include the cell identifier, it may be considered to indicate the RLF in the cell of the SeNB (for example, PUCCH cell of the SeNB). For example, a new MAC CE illustrated in FIGS. 23 and 24 may be defined.

Referring to FIG. 23, C7 of the new MAC CE indicates the RLF due to the RACH failure on a PUCCH carrying cell of the SeNB, and C6 indicates the RLF due to the RLC failure on a PUCCH carrying cell of the SeNB. Further, other bits may be in a reserved state.

Referring to FIG. 24, in order to indicate the cause of the RLF due to the RACH failure and the RLC failure, the MAC CE may be defined. At this time, C7 of the MAC CE indicates the RLF due to L1 out-of-sync on the PUCCH carrying cell of the SeNB, C6 indicates the RLF due to the RACH failure on the PUCCH carrying cell of the SeNB, and C5 indicates the RLF due to the RLC failure on the PUCCH carrying cell of the SeNB. Further, other bits may be in a reserved state.

Referring to FIG. 25, according to an embodiment of the present invention, the RLF may be transmitted to the MeNB by using the existing message (VarRLF-Report). At this time, in some embodiments of the present invention, "failedPCellId" may be set to identify the cell of the MeNB or the SeNB in which the RLF is generated. For example, the "failedPCellId" may be set as a PCell (of the MeNB) or a pSCell (corresponding to a special cell having the PUCCH of the SeNB). "rlf-Cause" may be set as one of the above described causes. Availability of the stored RLF report may be identified by the MeNB making a request for transmitting the stored RLF report to the UE. In an embodiment of the present invention, an indication of the availability transmitted to the MeNB may indicate that the RLF report is for the SeNB. For example, the availability may be indicated by transmitting the MAC CE. At this time, C7, C6, and C5 of the MAC CE may transmit the above-described information. That is, C7 indicates the RLF due to L1 out-of-sync on the PUCCH carrying cell of the SeNB, C6 indicates the RLF due to the RACH failure on the PUCCH carrying cell of the SeNB, and C5 indicates the RLF due to the RLC failure on the PUCCH carrying cell of the SeNB. Alternatively, as illustrated in FIG. 23, C7 of the new MAC CE may indicate the RLF due to the RACH failure on a PUCCH carrying cell of the SeNB and C6 may indicate the RLF due to the RLC failure on the PUCCH carrying cell of the SeNB. Meanwhile, C0 may indicate the availability of the RLF report. The eNB may use a legacy UE information request message and a UE information response message to acquire the report from the UE.

In another embodiment of the present invention, a physical (PHY) layer signal may be used to indicate the RLF on the SeNB and a cause thereof. For example, an RACH code may be preconfigured to specify the cause of the RLF.

In an embodiment of the present invention, the timer T310 for detecting the RLF may be configured to have different values.

One or more causes of the RLF may be applied to one or more cells served by the SeNB. For example, the RACH may be supported in only one cell of the SeNB (called pSCell), and thus, the RACH failure may be triggered only on the pSCell.

Figure 9:
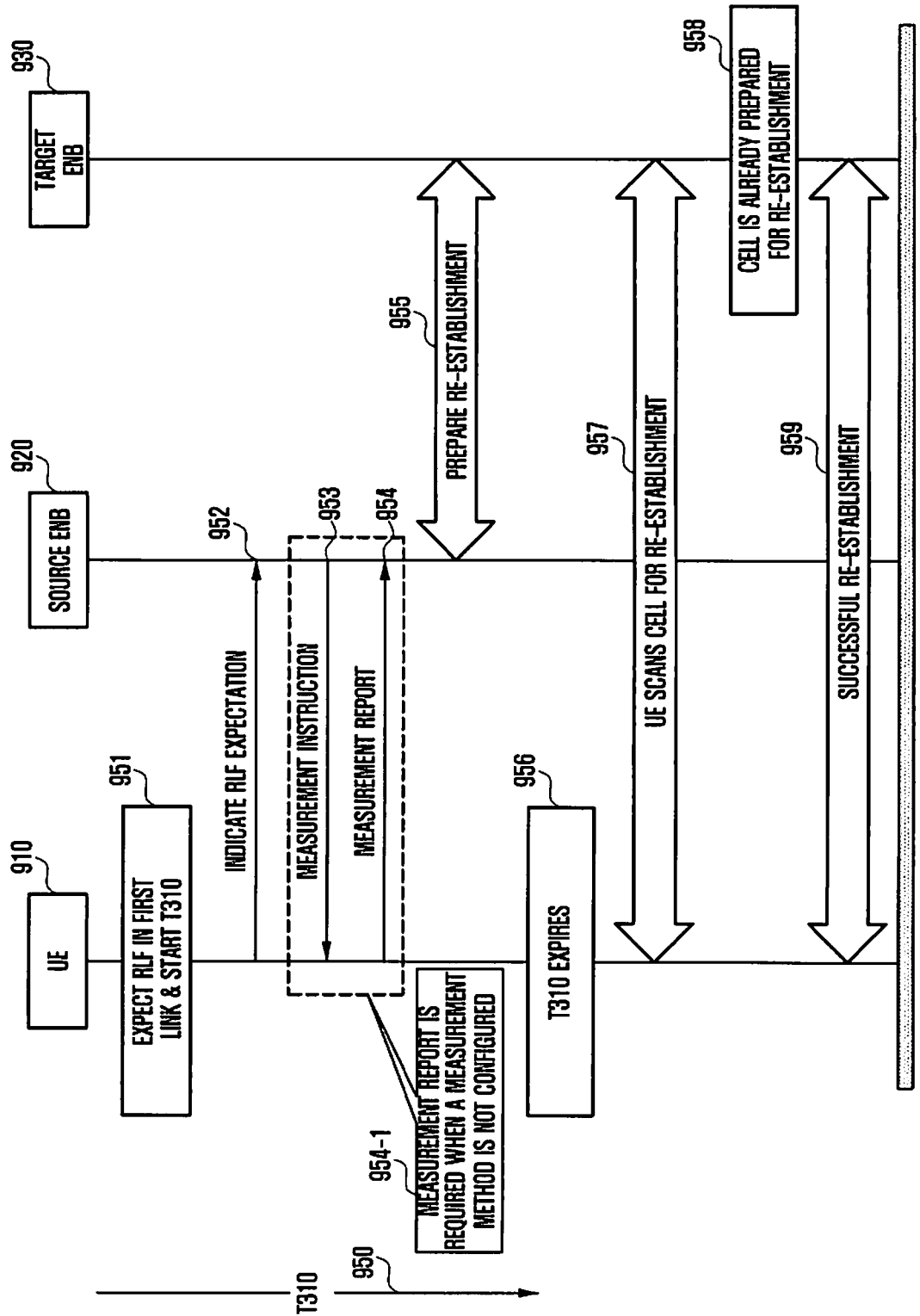
FIG. 9 is flowchart illustrating a process of an early indication of the RLF in a single connectivity system.

Further, in some embodiments of the present invention, an RLF message may include link identification information of a link in which the RLF is generated. The link identification information may indicate whether the link is a link of the MeNB or a link of the SeNB. For example, the link identification information may be a one bit identifier in the dual connectivity. The link identification information may be expanded in a multi-eNB system. FIG. 9 is a flowchart illustrating a process of an early indication of the RLF in a single connectivity system.

Referring to FIG. 9, an early indication of the RLF before the RLF timer expires may be used in the single connectivity system. A UE 910 expects the RLF in a first link, in step 951. For example, when the RLF timer T310 starts, the RLF may be expected. Alternatively, after a preset timer elapses from the start of the timer T310, the RLF may be expected. A detailed description thereof is set forth above.

Thereafter, in step 952, the UE 910 transmits an RLF expected message to a source eNB 920. When the source eNB 920 successfully receives the RLF expected message, the source eNB 920 sufficiently prepares a target cell 930 for early re-establishment. Steps 952 to 955 are similar to the operations of the above-described embodiments.

Thereafter, since the new cell 930, which has been already prepared for the re-establishment, (having the user context) has a high change when the RLF is actually generated, and thus, the UE 910 attempts the re-establishment to the new cell 930, a success rate of the re-establishment may increase.

The method of handling the RLF in the dual connectivity or the single connectivity has been described above.

Switching between the single connectivity and the dual connectivity is described in greater detail below.

Figure 10:
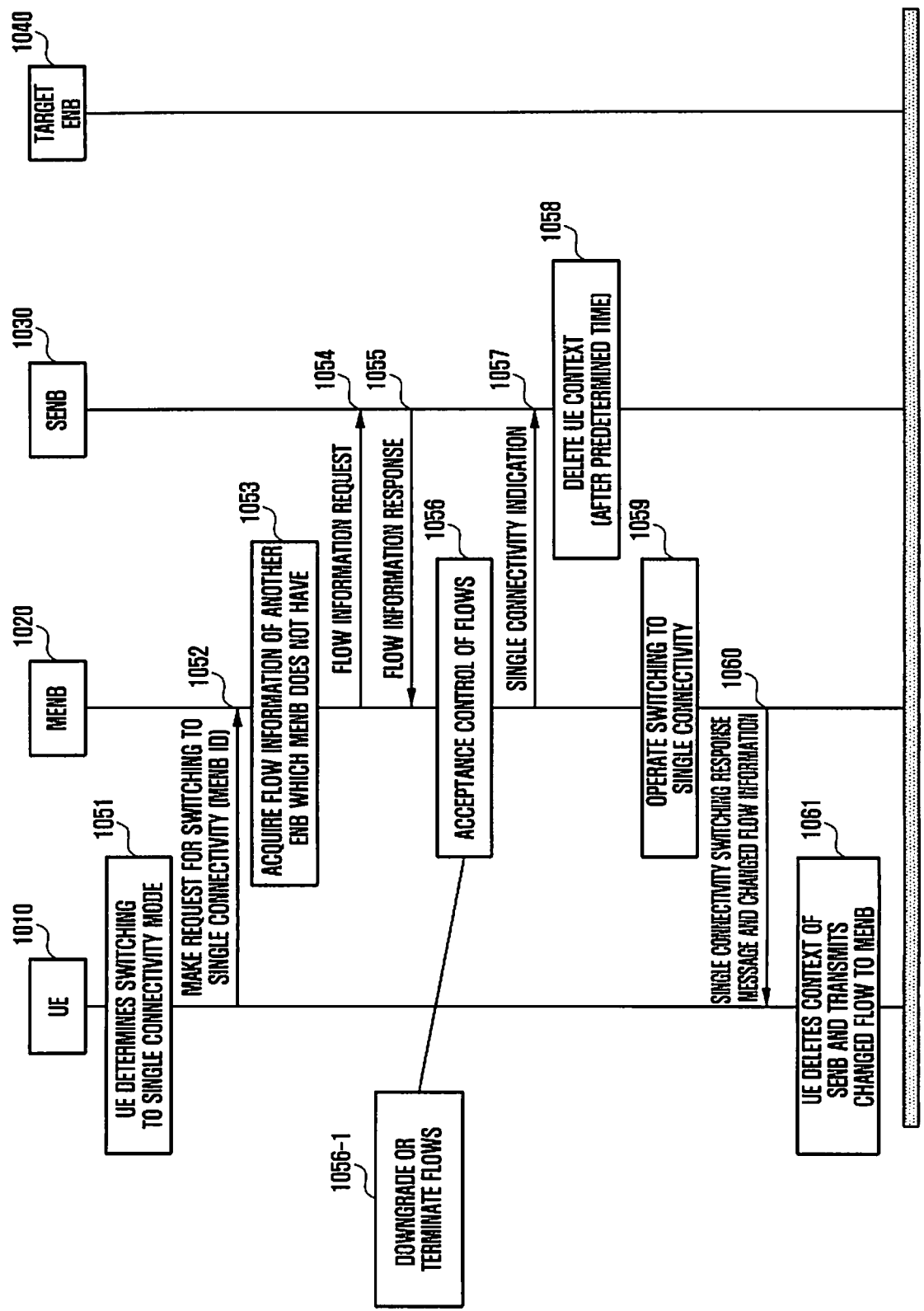
FIG. 10 is a flowchart illustrating a method of switching to single connectivity from dual connectivity, according to an embodiment of the present invention.

FIG. 10 is a flowchart illustrating a method of switching to the single connectivity from the dual connectivity, according to an embodiment of the present invention.

Referring to FIG. 10, a UE 1010 is currently connected to an MeNB 1020 and an SeNB 1030 in a dual connectivity mode. Further, the UE 1010 operates to switch to the single connectivity with the MeNB 1020. The UE 1010 determines the switching to the single connectivity mode, in step 1051, and transmits a single connectivity switching request message, indicating that the UE 1010 desires to switch to the single connectivity mode, to the MeNB 1020, in step 1052. At this time, the single connectivity switching request message may include an ID of the MeNB 1020.

Thereafter, the MeNB 1020 may fetch information on flows (for example, QoS and the like) serviced by the SeNB 1030. Specifically, in step 1053, the MeNB 1020 determines to acquire flow information of another eNB (for example, the SeNB 1030), which the MeNB 1020 does not have. Thereafter, in step 1054, the MeNB 1020 transmits a request message of flow information serviced by the SeNB 1030, to the SeNB 1030. The SeNB 1030 transmits a response message of the flow information serviced by the SeNB 1030, to the MeNB 1020, in step 1055.

The MeNB 1020 performs an acceptance control of the flows based on the received flow information, in step 1056. When the flows cannot be supported, the MeNB 1020 may downgrade or terminate the flows, in step 1056-1.

Thereafter, in order to identify the service provided to the UE 1010 in the single connectivity mode, the MeNB 1020 transmits a single connectivity indication message to the SeNB 1030, in step 1057. The SeNB 1030, having received the single connectivity indication message, deletes the UE context, in step 1058. At this time, in some embodiments of the present invention, the SeNB 1030 may delete the UE context after a preset time elapses.

Further, the MeNB 1020 triggers the switching to the single connectivity, in step 1059, and transmits changed flow information and a single connectivity switching response message to the UE 1010, in step 1060, so as to operate the UE 1010 to perform the switching to the single connectivity. Thereafter, in step 1061, the UE 1010 deletes the context of the SeNB 1030, and transmits the changed flows to the MeNB 1020, so as to switch to the single connectivity mode with the MeNB 1020.

Figure 11:
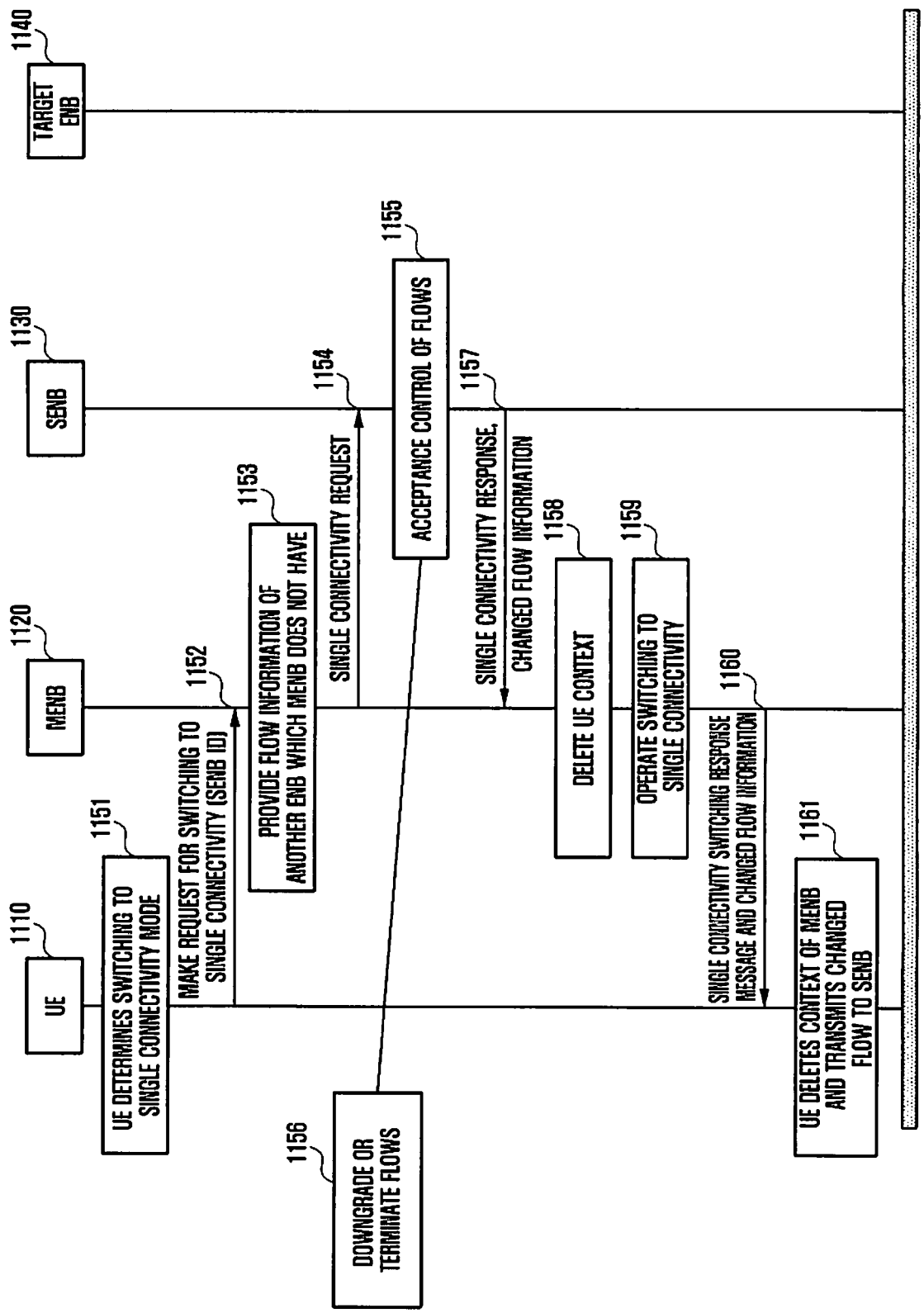
FIG. 11 is a flowchart illustrating a method of switching to single connectivity from dual connectivity, according to another embodiment of the present invention.

FIG. 11 is a flowchart illustrating a method of switching to the single connectivity from the dual connectivity, according to another embodiment of the present invention.

Referring to FIG. 11, a UE 1110 is currently connected to an MeNB 1120 and an SeNB 1130 in a dual connectivity mode. Further, the UE 1130 operates to switch to the single connectivity with the SeNB 1130. The UE 1110 determines the switching to the single connectivity mode, in step 1151, and transmits a single connectivity switching request message indicating that the UE 1110 desires to switch to the single connectivity mode, to the MeNB 1020, in step 1152. At this time, the single connectivity switching request message may include an ID of the SeNB 1130.

Thereafter, the MeNB 1120 determines to provide information on flows (for example, QoS and the like) serviced by the MeNB 1120, to the SeNB 1130, in step 1153. In step 1154, the MeNB 1120 transmits the single connectivity request message to the SeNB 1130. At this time, the MeNB 1120 may also transmit information on flows serviced by the MeNB 1120.

The SeNB 1130 performs an acceptance control of the flows based on the received flow information, in step 1155. When the flows cannot be supported, the MeNB 1130 may downgrade or terminate the flows, in step 1156.

Thereafter, in order to identify the service provided to the UE 1010 in the single connectivity mode, the SeNB 1130 transmits a single connectivity response message to the MeNB 1030, in step 1157. At this time, flow information may be transmitted to the MeNB 1120 together with the single connectivity response message.

The MeNB 1120, having received the single connectivity response message, deletes the UE context, in step 1158. At this time, in some embodiments of the present invention, the MeNB 1120 may delete the UE context after a preset time elapses.

Further, the MeNB 1120 triggers the switching to the single connectivity, in step 1159, and transmits changed flow information and a single connectivity switching response message to the UE 1110, in step 1160, so as to operate the UE 1110 to perform the switching to the single connectivity. Thereafter, in step 1161, the UE 1110 deletes the context of the MeNB 1120, and transmits the changed flows to the SeNB 1130, so as to switch to the single connectivity mode with the SeNB 1130.

Figure 12:
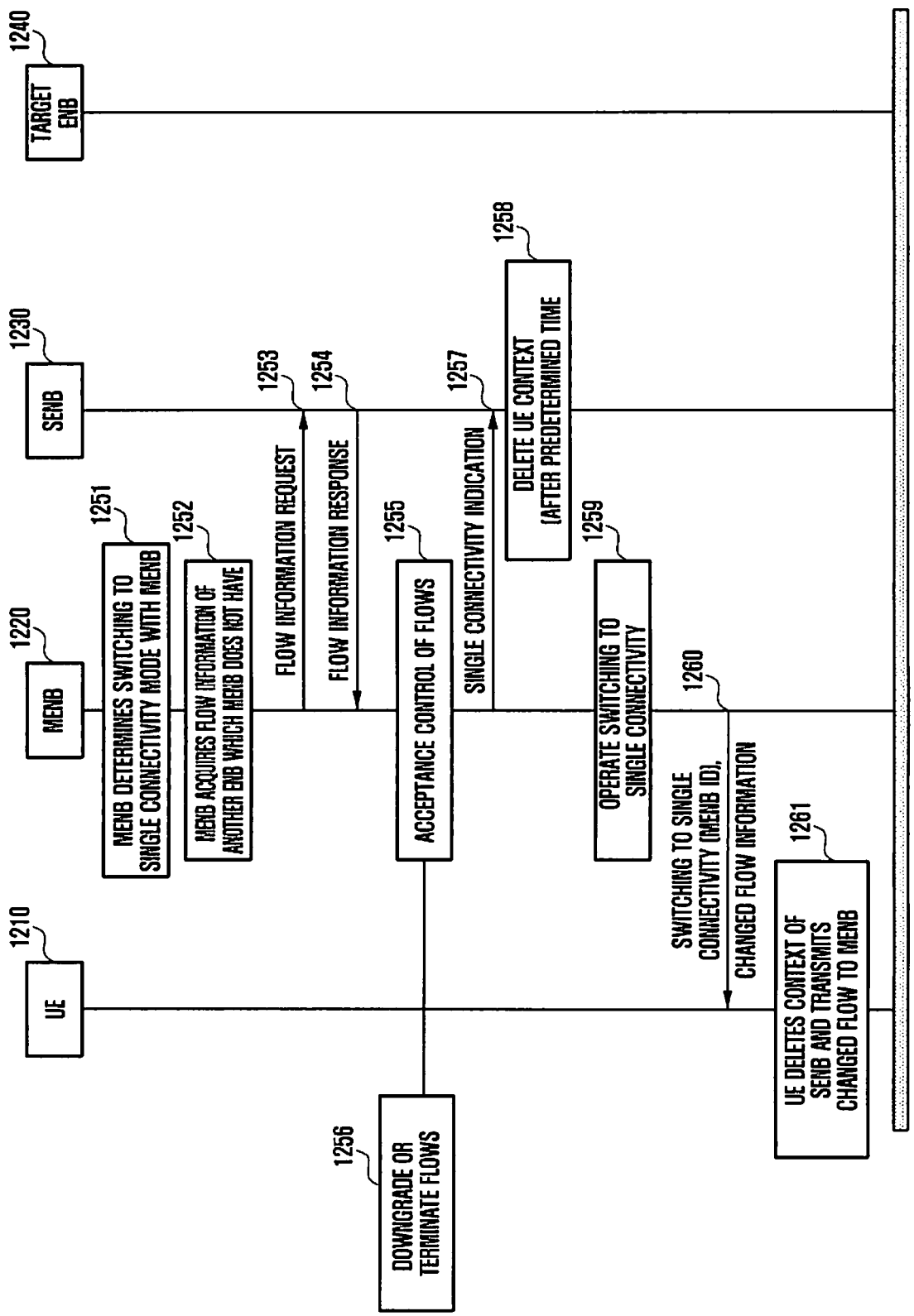
FIG. 12 is a flowchart illustrating a method of switching to single connectivity from dual connectivity, according to another embodiment of the present invention.

FIG. 12 is a flowchart illustrating a method of switching to the single connectivity from the dual connectivity, according to another embodiment of the present invention.

Referring to FIG. 12, a UE 1210 is currently connected to an MeNB 1220 and an SeNB 1230 in a dual connectivity mode. Further, the UE 1210 operates to switch to the single connectivity with the MeNB 1220. In step 1251, the MeNB 1220 determines that the UE 1210 switches to the single connectivity mode with the MeNB 1220.

Thereafter, the MeNB 1220 fetches information on flows (for example, QoS and the like) serviced by the SeNB 1230. Specifically, in step 1252, the MeNB 1220 determines to acquire flow information of another eNB (for example, the SeNB 1230), which the MeNB 1220 does not have. Thereafter, in step 1253, the MeNB 1220 transmits a request message of flow information serviced by the SeNB 1230, to the SeNB 1230. The SeNB 1230 transmits a response message of the flow information serviced by the SeNB 1220, to the MeNB 1020, in step 1254.

The MeNB 1220 performs an acceptance control of the flows based on the received flow information, in step 1255. When the flows cannot be supported, the MeNB 1220 may downgrade or terminate the flows, in step 1256.

Thereafter, in order to identify the service provided to the UE 1210 in the single connectivity mode, the MeNB 1220 transmits a single connectivity indication message to the SeNB 1230, in step 1257. The SeNB 1230 having received the single connectivity indication message deletes the UE context, in step 1258. At this time, in some embodiments of the present invention, the SeNB 1230 may delete the UE context after a preset time elapses.

Further, the MeNB 1220 triggers the switching to the single connectivity, in step 1259, and transmits an ID of the MeNB 1220, changed flow information, and a single connectivity switching message, to the UE 1210, in step 1260, so as to operate the UE 1210 to perform the switching to the single connectivity. Thereafter, in step 1261, the UE 1210 deletes the context of the SeNB 1230, and transmits the changed flows to the MeNB 1220, so as to switch to the single connectivity mode with the MeNB 1220.

Figure 13:
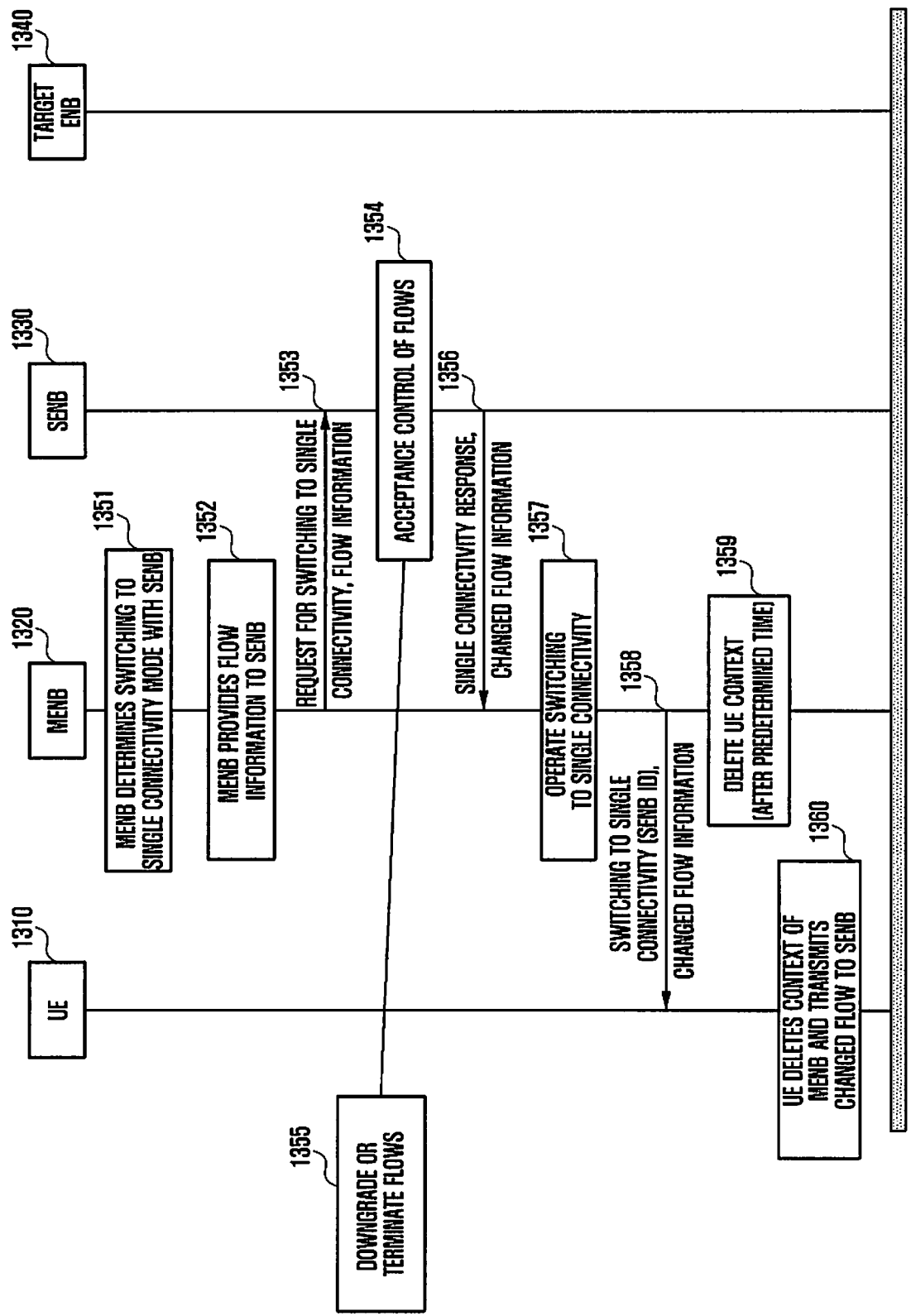
FIG. 13 is a flowchart illustrating a method of switching to single connectivity from dual connectivity, according to another embodiment of the present invention.

FIG. 13 is a flowchart illustrating a method of switching to the single connectivity from the dual connectivity, according to another embodiment of the present invention.

Referring to FIG. 13, a UE 1310 is currently connected to an MeNB 1320 and an SeNB 1330 in a dual connectivity mode. Further, the UE 1310 operates to switch to the single connectivity with the SeNB 1330. In step 1351, the MeNB 1320 determines that the UE 1310 switches to the single connectivity mode with the SeNB 1330.

Thereafter, the MeNB 1320 determines to provide information on flows (for example, QoS and the like) serviced by the MeNB 1320, to the SeNB 1330, in step 1352. In step 1353, the MeNB 1320 transmits the single connectivity switching request message to the SeNB 1330. At this time, the MeNB 1320 may also transmit information on flows serviced by the MeNB 1320.

The SeNB 1330 performs an acceptance control of the flows based on the received flow information, in step 1354. When the flows cannot be supported, the SeNB 1330 may downgrade or terminate the flows, in step 1355.

Thereafter, in order to identify the service provided to the UE 1310 in the single connectivity mode, the SeNB 1330 transmits a single connectivity response message to the MeNB 1320, in step 1356. At this time, changed flow information may be transmitted to the MeNB 1320 together with the single connectivity response message.

Further, the MeNB 1320 triggers the switching to the single connectivity, in step 1357, and transmits an ID of the MeNB 1320, the changed flow information, and a single connectivity switching response message to the UE 1310, in step 1358, so as to operate the UE 1310 to perform the switching to the single connectivity.

Thereafter, the MeNB 1320 deletes the UE context, in step 1359. At this time, in some embodiments, the MeNB 1320 may delete the UE context after a preset time elapses.

Thereafter, in step 1360, the UE 1310 deletes the context of the MeNB 1320, and transmits the changed flows to the SeNB 1330, so as to switch to the single connectivity mode with the SeNB 1330.

Figure 14:
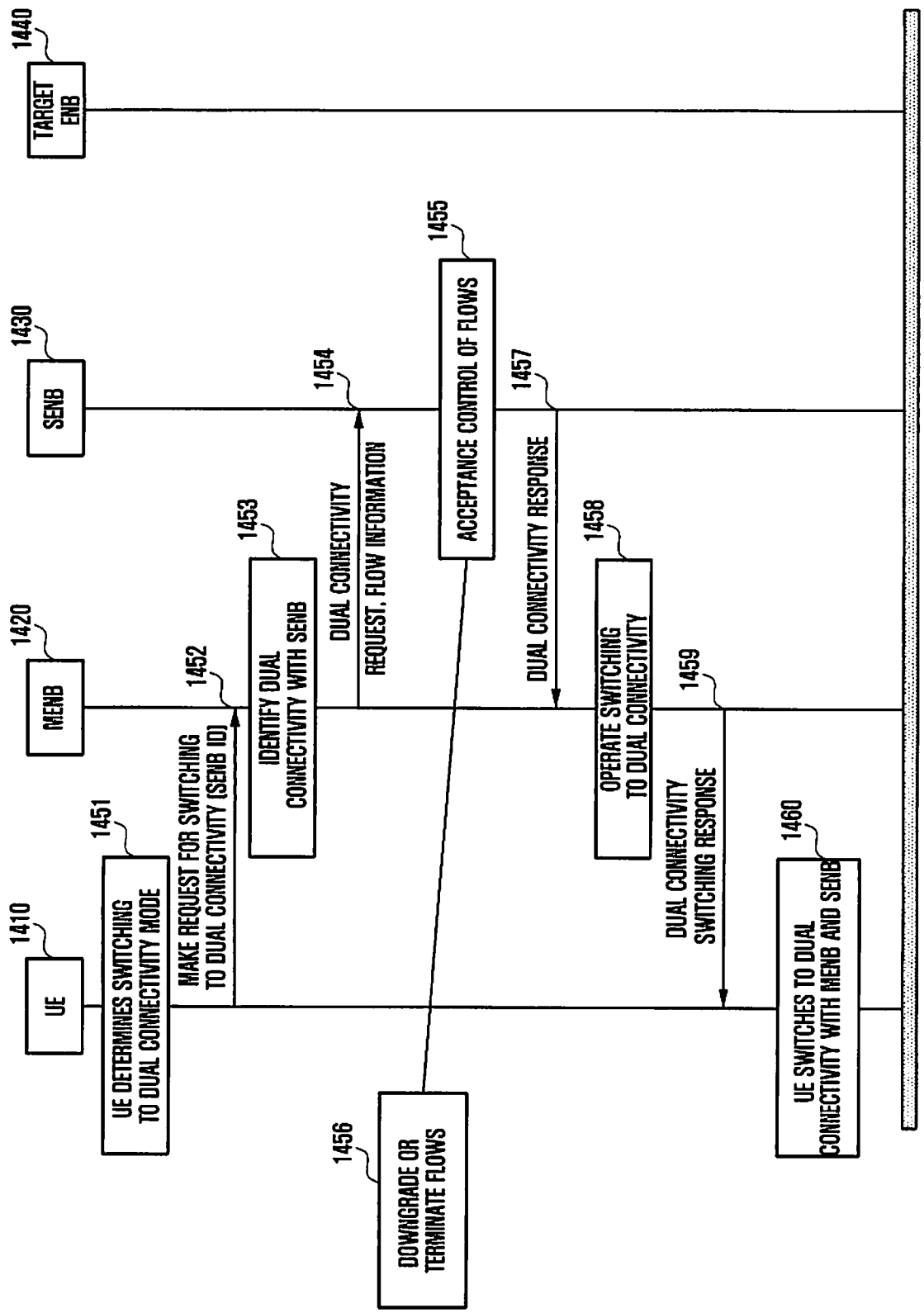
FIG. 14 is a flowchart illustrating a method of switching to dual connectivity from single connectivity, according to an embodiment of the present invention.

FIG. 14 is a flowchart of a method of switching to the dual connectivity from the single connectivity, according to an embodiment of the present invention.

Referring to FIG. 14, a UE 1410 currently operates in the single connectivity mode with an MeNB 1420. Further, the UE 1410 determines the switching to the dual connectivity from the signal connectivity, in step 1451, and transmits a dual connectivity switching request message, indicating that the UE 1410 desires to switch to the dual connectivity mode, to the MeNB 1420, in step 1452. At this time, the dual connectivity switching request message may include an ID of an SeNB 1430.

The MeNB 1420 identifies the dual connectivity with the SeNB 1430, in step 1453. For example, the identification of the dual connectivity may be performed by identifying a flow acceptance control and a pair of the MeNB and the SeNB to support the dual connectivity, but is not limited thereto.

Thereafter, the MeNB 1420 transmits the dual connectivity request message to the SeNB 1430, in step 1454. At this time, the dual connectivity request message may include flow information. The SeNB 1430 performs an acceptance control of the flows based on the received flow information, in step 1455. When the flows cannot be supported, the SeNB 1430 may downgrade or terminate the flows, in step 1456.

In step 1457, the SeNB 1430 identifies support for the acceptance of the dual connectivity by transmitting a dual connectivity response message to the MeNB 1420. Further, in step 1458, the MeNB 1420 triggers the switching to the dual connectivity. Thereafter, in step 1459, the MeNB 1420 transmits the dual connectivity switching response message to the UE 1410 to operate the UE 1410 to perform the switching to 2o the dual connectivity. In step 1460, the UE 1410 switches to the dual connectivity mode with the MeNB 1420 and the SeNB 1430.

Figure 15:
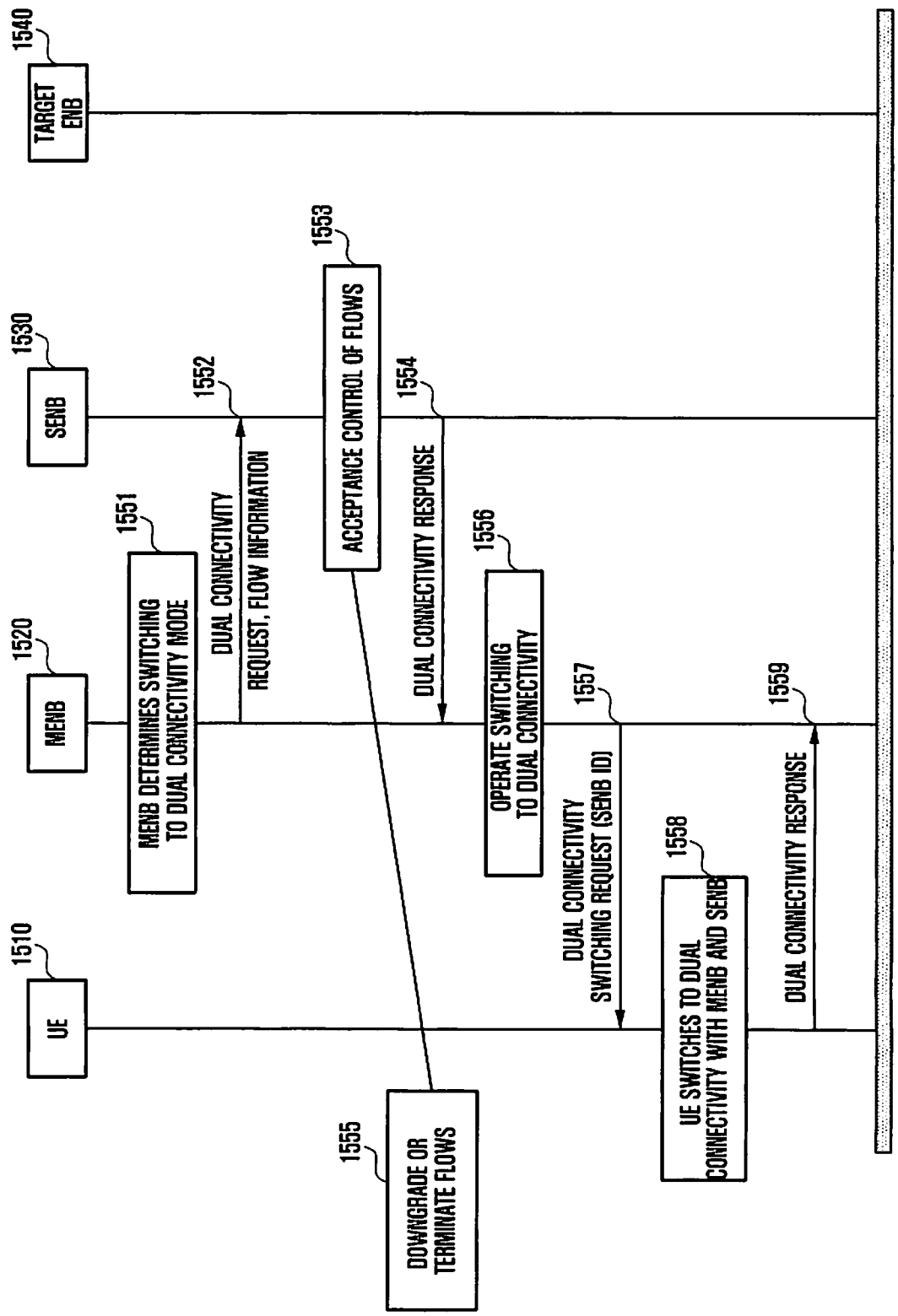
FIG. 15 is a flowchart illustrating a method of switching to dual connectivity from single connectivity, according to another embodiment of the present invention.

FIG. 15 is a flowchart illustrating a method of switching to the dual connectivity from the single connectivity, according to another embodiment of the present invention.

Referring to FIG. 15, a UE 1510 currently operates in the single connectivity mode with an MeNB 1520. Further, in step 1551, the MeNB 1520 triggers the switching to the dual connectivity from the single connectivity. At this time, the MeNB 1520 identifies the dual connectivity with the SeNB 1530. For example, the identification of the dual connectivity may be performed by identifying a flow acceptance control and a pair of the MeNB and the SeNB to support the dual connectivity, but is not limited thereto.

Thereafter, in step 1552, the MeNB 1520 transmits a dual connectivity request message, indicating that the UE 1510 desires to switch to the dual connectivity mode, to the SeNB 1530. At this time, the dual connectivity request message may include flow information.

The SeNB 1530 performs an acceptance control of the flows based on the received flow information, in step 1553. When the flows cannot be supported, the SeNB 1530 may downgrade or terminate the flows, in step 1555.

In step 1554, the SeNB 1530 identifies support for the acceptance of the dual connectivity by transmitting a dual connectivity response message to the MeNB 1520. Further, in step 1556, the MeNB 1520 triggers the switching to the dual connectivity. Thereafter, in step 1557, the MeNB 1520 operates the UE 1510 to perform the switching to the dual connectivity by transmitting the dual connectivity switching response message, including an ID of the SeNB 1530 and flow information, to the UE 1510. In step 1558, the UE 1510 switches to the dual connectivity mode with the MeNB 1520 and the SeNB 1530. Further, the UE 1510 transmits the dual connectivity response message to the MeNB 1520, in step 1559.

Figure 16:
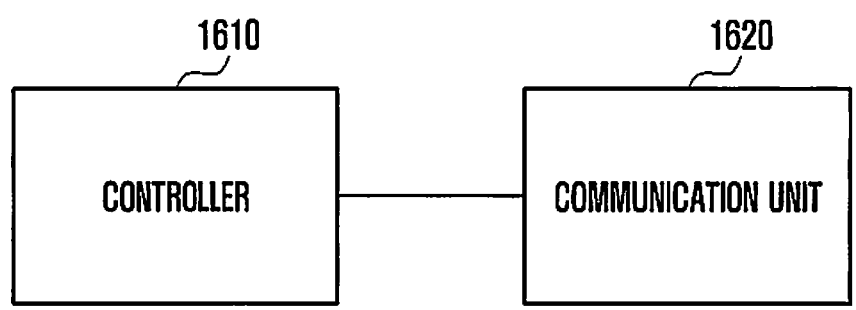
FIG. 16 is a block diagram illustrating a UE, according to an embodiment of the present invention.

FIG. 16 is a block diagram illustrating the UE, according to an embodiment of the present invention.

Referring to FIG. 16, a controller 1610 controls the UE to perform any operation described in the aforementioned embodiments of the present invention. For example, the controller 1610 may provide a control to transmit an RLF expected message related to a first link to the eNB, transmit an RLF message related to the first link to the eNB through a second link, and receive an instruction of a handover to a target cell selected by the eNB according to the RLF expected message.

A communication unit 1620 transmits and receives a signal according to any operation described in the aforementioned embodiments of the present invention. For example, the communication unit 1620 may transmit the RLF message and the RLF expected message to the MeNB.

Figure 17:
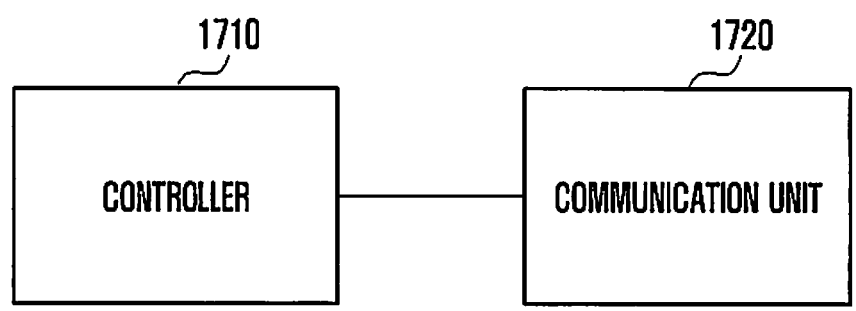
FIG. 17 is a block diagram illustrating an eNB, according to an embodiment of the present invention.

FIG. 17 is a block diagram illustrating the eNB, according to an embodiment of the present invention.

Referring to FIG. 17, a controller 1710 controls the eNB to perform any one operation described in the aforementioned embodiments of the present invention. For example, the controller 1710 may provide a control to receive an RLF expected message related to a first link from the UE, search for a target cell for a handover of the UE according to the RLF expected message, select the target cell when the target cell exists as a result of the search, receive an RLF message related to the first link from the UE through a second link, and transmit an instruction of a handover to the selected target cell to the UE.

A communication unit 1720 transmits and receives a signal according to any operation described in the aforementioned embodiments of the present invention. For example, the communication unit 1720 may receive the RLF message and the RLF expected message from the UE.

Software components including instructions or code for performing the methodologies described herein may be stored in one or more associated memory devices (e.g., Read Only Memory (ROM), fixed or removable memory) and, when ready to be utilized, loaded in part or in whole (e.g., into Random Access Memory (RAM)) and executed by the controller.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method by a terminal in a wireless communication system supporting dual connectivity of a first base station and a second base station, the method comprising:
   receiving information on a number of consecutive out-of-syncs for a special cell;
   starting a timer for the special cell upon receiving the information on the number of consecutive out-of-syncs;
   detecting a radio link failure (RLF) for the special cell upon an expiration of the timer; and
   transmitting, to the first base station, a failure message including failure type in case that the RLF for the special cell is associated with the second base station,
   wherein the failure type indicates an expiration of the timer.

2. The method of claim 1, wherein transmitting the failure message further comprises:
   suspending a transmission for at least one bearer associated with a cell of the second base station.

3. The method of claim 1, wherein a physical uplink control channel (PUCCH) for the second base station is transmitted on a primary secondary cell associated with the second base station.

4. The method of claim 1, wherein the RLF is detected based on a random access problem indication, and
   wherein the failure type indicates the random access problem.

5. The method of claim 1, wherein the RLF is detected in case that a radio link control (RLC) maximum number retransmission has been reached, and
   wherein the failure type indicates the RLC maximum number retransmission.

6. A method by a first base station in a wireless communication system supporting dual connectivity of the first base station and a second base station, the method comprising:
   transmitting, to a terminal, a message for configuring a cell associated with the first base station; and
   receiving, from the terminal, a failure message including failure type in case that a radio link failure (RLF) for a special cell is detected upon an expiration of a timer for the special cell and the special cell is associated with the second base station, wherein the timer is started in case that information on a number of consecutive out-of-syncs for the special cell is received at the terminal, and wherein the failure type indicates an expiration of the timer.

7. The method of claim 6, wherein a transmission for at least one bearer associated with a cell of the second base station is suspended.

8. The method of claim 6, wherein a physical uplink control channel (PUCCH) for the second base station is received on a primary secondary cell associated with the second base station.

9. The method of claim 6, wherein the RLF is detected based on a random access problem indication, and wherein the failure type indicates the random access problem.

10. The method of claim 6, wherein the RLF is detected in case that a radio link control (RLC) maximum number retransmission has been reached, and wherein the failure type indicates the RLC maximum number retransmission.

11. A terminal in a wireless communication system supporting dual connectivity of a first base station and a second base station, the terminal comprising:

a transceiver; and a controller coupled with the transceiver and configured to:

receive information on a number of consecutive out-of-syncs for a special cell, start a timer for the special cell upon receiving the information on the number of consecutive out-of-syncs, detect a radio link failure (RLF) for the special cell upon an expiration of the timer, and transmit, to the first base station, a failure message including failure type in case that the RLF for the special cell is associated with the second base station, wherein the failure type indicates an expiration of the timer.

12. The terminal of claim 11, wherein the controller is configured to suspend a transmission for at least one bearer associated with a cell of the second base station.

13. The terminal of claim 11, wherein a physical uplink control channel (PUCCH) for the second base station is transmitted on a primary secondary cell associated with the second base station.

14. The terminal of claim 11, wherein the RLF is detected based on a random access problem indication, and wherein the failure type indicates the random access problem.

15. The terminal of claim 11, wherein the RLF is detected in case that a radio link control (RLC) maximum number retransmission has been reached, and wherein the failure type indicates the RLC maximum number retransmission.

16. A first base station in a wireless communication system supporting dual connectivity, the first base station comprising:

a transceiver; and a controller coupled with the transceiver and configured to:

transmit, to a terminal, a message for configuring cell associated with the first base station, and receive, from the terminal, a failure message including failure type in case that a radio link failure (RLF) for a special cell is detected upon an expiration of a timer for the special cell and the special cell is associated with a second base station, wherein the timer is started in case that information on a number of consecutive out-of-syncs for the special cell is received at the terminal, and wherein the failure type indicates an expiration of the timer.

17. The first base station of claim 16, wherein a transmission for at least one bearer associated with a cell of the second base station is suspended.

18. The first base station of claim 16, wherein a physical uplink control channel (PUCCH) for the second base station is received on a primary secondary cell associated with the second base station.

19. The first base station of claim 16, wherein the RLF is detected based on a random access problem indication, and wherein the failure type indicates the random access problem.

20. The first base station of claim 16, wherein the RLF is detected in case that a radio link control (RLC) maximum number retransmission has been reached, and wherein the failure type indicates the RLC maximum number retransmission.

* * * * *